(12) United States Patent
Li et al.

(10) Patent No.: US 10,448,348 B2
(45) Date of Patent: Oct. 15, 2019

(54) REAL-TIME TRANSPORT PROTOCOL RTP PACKET TRANSMISSION METHOD AND APPARATUS

(71) Applicant: Huawei Technologies Co., Ltd., Shenzhen, Guangdong (CN)

(72) Inventors: Zhiming Li, Reading (GB); Longyu Cao, Shanghai (CN); Fenqin Zhu, Shanghai (CN)

(73) Assignee: HUAWEI TECHNOLOGIES CO., LTD., Shenzhen, Guangdong (CN)

(*) Notice: Subject to any disclaimer, the term of this patent is extended or adjusted under 35 U.S.C. 154(b) by 144 days.

(21) Appl. No.: 15/700,661

(22) Filed: Sep. 11, 2017

(65) Prior Publication Data

US 2017/0374633 A1    Dec. 28, 2017

Related U.S. Application Data

(63) Continuation of application No. PCT/CN2015/074104, filed on Mar. 12, 2015.

(51) Int. Cl.
*H04W 56/00* (2009.01)
*H04L 29/06* (2006.01)
(Continued)

(52) U.S. Cl.
CPC .......... *H04W 56/001* (2013.01); *H04L 29/06* (2013.01); *H04L 65/4076* (2013.01);
(Continued)

(58) Field of Classification Search
CPC ... H04L 12/189; H04L 29/06; H04L 65/1063; H04L 65/4076; H04L 65/608;
(Continued)

(56) References Cited

U.S. PATENT DOCUMENTS 7,734,762 B2 * 6/2010 Hundscheidt ......... H04W 28/10
                                                      709/224
7,764,971 B2 * 7/2010 Chu .................... H04L 65/4061
                                                      370/260
(Continued)

FOREIGN PATENT DOCUMENTS

AU    2014415894 A1 *  8/2017 .............. H04W 4/10
AU    2014415981 A1 *  8/2017 .............. H04W 4/10
(Continued)

OTHER PUBLICATIONS

3GPP Technical Specification 29.468, 3rd Generation Partnership Project; Technical Specification Group Core Network and Terminals; Group Communication System Enablers for LTE (GCSE_LTE); MB2 Reference Point; Dec. 2014, 3GPP, V12.1.0 (Year: 2014).*

(Continued)

*Primary Examiner* — Eric Nowlin
(74) *Attorney, Agent, or Firm* — Womble Bond Dickinson (US) LLP

(57) ABSTRACT

Embodiments of the present disclosure provide an RTP packet transmission method and apparatus. A GCS AS or a BM-SC provides synchronization source information of the GCS AS and synchronization source information of the BM-SC for UE, so that the UE can continuously receive RTP packets. On one hand, the GCS AS (or the BM-SC) may provide the synchronization source information of the GCS AS (or the synchronization source information of the BM-SC) for the UE by sending an RTP packet. On the other hand, the GCS AS (or the BM-SC) further provides the synchronization source information of the BM-SC (or the synchronization source information of the GCS AS) for the UE. Therefore, when being in a unicast (multicast) transmission mode, the UE can obtain both of the synchronization source information of the GCS AS and the synchronization source information of the BM-SC.

16 Claims, 6 Drawing Sheets

(51) Int. Cl.
*H04W 4/06* (2009.01)
*H04L 12/18* (2006.01)
*H04W 4/08* (2009.01)

(52) U.S. Cl.
CPC .............. *H04L 69/22* (2013.01); *H04W 4/06* (2013.01); *H04L 12/189* (2013.01); *H04L 65/1063* (2013.01); *H04L 65/608* (2013.01); *H04W 4/08* (2013.01)

(58) Field of Classification Search
CPC .......... H04L 69/22; H04W 4/06; H04W 4/08; H04W 4/60; H04W 56/001; H04W 76/40; H04W 72/005
See application file for complete search history.

(56) References Cited

U.S. PATENT DOCUMENTS

| | | | | |
|---|---|---|---|---|
| 7,809,391 B2* | 10/2010 | Kwon | ................. | H04W 4/10 455/519 |
| 7,991,419 B2* | 8/2011 | Matsumoto | ............. | H04W 4/10 455/518 |
| 8,064,943 B2* | 11/2011 | Li | ........................ | H04W 4/08 455/518 |
| 8,170,596 B2* | 5/2012 | Lindner | ................. | H04W 4/10 455/518 |
| 8,233,446 B2* | 7/2012 | Vedantham | ....... | H04W 36/0007 370/329 |
| 8,886,242 B2* | 11/2014 | Blicker | ................. | H04M 15/49 455/518 |
| 9,077,667 B2* | 7/2015 | Sridhar | .................. | H04L 45/74 |
| 9,288,810 B2* | 3/2016 | Karunakaran | ...... | H04W 56/001 |
| 9,386,054 B2* | 7/2016 | George | .................. | H04W 4/10 |
| 9,674,675 B2* | 6/2017 | Lindner | ................. | H04W 4/10 |
| 9,716,739 B2* | 7/2017 | Krishna | ................. | H04L 65/80 |
| 9,722,976 B1* | 8/2017 | Li | ....................... | H04L 63/0428 |
| 9,871,808 B2* | 1/2018 | Tang | ................... | H04L 65/1016 |
| 9,894,496 B2* | 2/2018 | Baek | ................... | H04W 4/90 |
| 9,900,291 B2* | 2/2018 | Li | ....................... | H04L 63/0428 |
| 9,949,095 B2* | 4/2018 | Dong | .................. | H04W 4/10 |
| 10,085,124 B2* | 9/2018 | Patel | .................. | H04W 4/10 |
| 10,142,808 B2* | 11/2018 | Dong | .................. | H04W 4/10 |
| 10,225,699 B2* | 3/2019 | Sedlacek | ............ | H04L 63/0876 |
| 2006/0040685 A1* | 2/2006 | Kwon | .................. | H04W 4/10 455/507 |
| 2006/0069799 A1* | 3/2006 | Hundscheidt | ......... | H04W 28/10 709/232 |
| 2007/0275747 A1* | 11/2007 | Blicker | ................. | H04M 15/49 455/518 |
| 2008/0039029 A1* | 2/2008 | Dostal | ................ | H04L 29/06 455/90.2 |
| 2008/0040759 A1* | 2/2008 | She | ................... | H04L 29/06027 725/81 |
| 2008/0220765 A1* | 9/2008 | Chu | ................... | H04L 65/4061 455/422.1 |
| 2009/0110132 A1* | 4/2009 | Kondrad | ............ | H04L 65/4076 375/354 |
| 2009/0197625 A1* | 8/2009 | Zhang | ................ | H04W 72/005 455/518 |
| 2009/0270119 A1* | 10/2009 | Li | ........................ | H04W 4/08 455/518 |
| 2009/0316615 A1* | 12/2009 | Vedantham | ....... | H04W 36/0007 370/312 |
| 2010/0296476 A1 | 11/2010 | Li et al. | | |
| 2013/0084912 A1* | 4/2013 | Lindner | ................. | H04W 4/10 455/518 |
| 2014/0106808 A1* | 4/2014 | Agulnik | ............. | H04L 65/4061 455/519 |
| 2014/0112244 A1* | 4/2014 | Lindner | ................ | H04L 65/4061 370/328 |
| 2014/0369344 A1* | 12/2014 | Sridhar | .................. | H04L 45/74 370/352 |
| 2015/0163788 A1* | 6/2015 | Karunakaran | ...... | H04W 56/001 370/254 |
| 2015/0295946 A1* | 10/2015 | Tang | ................... | H04L 65/1016 726/22 |
| 2016/0173556 A1* | 6/2016 | Park | ................... | H04N 21/2381 709/219 |
| 2016/0323348 A1* | 11/2016 | Bradbury | ................ | H04L 67/02 |
| 2016/0352801 A1* | 12/2016 | Krishna | ................ | H04L 65/80 |
| 2017/0142756 A1* | 5/2017 | Lee | ...................... | H04W 76/45 |
| 2017/0201552 A1* | 7/2017 | Lindner | ................ | H04W 4/10 |
| 2017/0201603 A1* | 7/2017 | Uchino | ................ | H04W 36/02 |
| 2017/0245123 A1* | 8/2017 | Baek | ...................... | H04W 4/90 |
| 2017/0272408 A1* | 9/2017 | Li | ........................ | H04L 63/0428 |
| 2017/0289214 A1* | 10/2017 | Cho | ................... | H04L 65/4069 |
| 2017/0289776 A1* | 10/2017 | Kim | ................... | H04W 4/08 |
| 2017/0295475 A1* | 10/2017 | Patel | ................... | H04W 4/10 |
| 2017/0303100 A1* | 10/2017 | Dong | .................... | H04W 4/10 |
| 2017/0303102 A1* | 10/2017 | Dong | .................... | H04W 4/10 |
| 2017/0311135 A1* | 10/2017 | Liu | ...................... | H04L 12/14 |
| 2017/0374633 A1* | 12/2017 | Li | ........................ | H04L 29/06 |
| 2018/0007110 A1* | 1/2018 | Wu | ..................... | H04L 65/1046 |
| 2018/0092134 A1* | 3/2018 | Ayyasamy | ............ | H04W 76/45 |
| 2018/0103364 A1* | 4/2018 | Gholmieh | ........... | H04W 40/246 |
| 2018/0123962 A1* | 5/2018 | Li | ........................ | H04L 43/0852 |
| 2018/0124578 A1* | 5/2018 | Sedlacek | ............ | H04L 63/0876 |
| 2018/0124604 A1* | 5/2018 | Rajadurai | ............... | H04L 29/06 |
| 2018/0132072 A1* | 5/2018 | Hyun | ................... | H04W 4/10 |
| 2018/0167786 A1* | 6/2018 | Wu | ..................... | H04W 72/04 |
| 2018/0199301 A1* | 7/2018 | Hori | ..................... | H04W 4/10 |
| 2018/0220270 A1* | 8/2018 | Wu | ..................... | H04W 4/10 |
| 2018/0288827 A1* | 10/2018 | Pattan | ..................... | H04W 4/10 |
| 2018/0317144 A1* | 11/2018 | Hori | ....................... | H04L 29/08 |
| 2019/0007803 A1* | 1/2019 | Sedlacek | ............ | H04L 63/0876 |

FOREIGN PATENT DOCUMENTS

| | | | | |
|---|---|---|---|---|
| AU | 2014415894 B2 * | 8/2018 | ............. | H04W 4/10 |
| CN | 101227745 A | 7/2008 | | |
| CN | 101771661 A | 7/2010 | | |
| CN | 101803409 A | 8/2010 | | |
| CN | 101889418 A | 11/2010 | | |
| CN | 102379111 A * | 3/2012 | ............. | H04W 4/10 |
| CN | 104394119 | 3/2015 | | |
| CN | 104394119 A | 3/2015 | | |
| CN | 106068625 A * | 11/2016 | ............. | H04L 12/14 |
| CN | 107005539 A * | 8/2017 | ............. | H04W 4/08 |
| CN | 107005976 A * | 8/2017 | ............. | H04W 72/04 |
| CN | 107113582 A * | 8/2017 | ............. | H04W 4/10 |
| CN | 107113583 A * | 8/2017 | ............. | H04W 4/10 |
| EP | 1661420 A1 * | 5/2006 | ............. | H04N 15/49 |
| EP | 1887751 A1 * | 2/2008 | ............. | H04L 29/06 |
| EP | 1661420 B1 * | 9/2014 | ............. | H04M 15/49 |
| EP | 2160906 61 | 7/2015 | | |
| EP | 2160906 B1 | 7/2015 | | |
| EP | 3229503 A1 * | 10/2017 | ............. | H04W 4/10 |
| EP | 3232606 A1 * | 10/2017 | ............. | H04L 12/14 |
| EP | 3240316 A1 * | 11/2017 | ............. | H04W 4/10 |
| EP | 3232606 A4 * | 12/2017 | ............. | H04L 12/14 |
| EP | 3240316 A4 * | 12/2017 | ............. | H04W 4/10 |
| EP | 3229503 A4 * | 1/2018 | ............. | H04W 4/10 |
| EP | 3284277 A1 * | 2/2018 | ............. | H04L 29/06 |
| EP | 3284277 A4 * | 4/2018 | ............. | H04L 29/06 |
| EP | 3310108 A1 * | 4/2018 | ............. | H04W 72/04 |
| EP | 3310108 A4 * | 7/2018 | ............. | H04W 72/04 |
| JP | WO2017051503 A1 * | 7/2018 | ............. | H04W 4/10 |
| JP | WO2017126246 A1 * | 11/2018 | ............. | H04L 29/08 |
| KR | 101528959 B1 * | 6/2015 | ............. | H04W 4/10 |
| KR | 20180008411 A * | 1/2018 | ............. | H04L 29/06 |
| KR | 20180021835 A * | 3/2018 | ............. | H04W 72/04 |
| KR | 20180049243 A * | 5/2018 | ............. | H04W 4/10 |
| RU | 2663825 C1 * | 8/2018 | ............. | H04W 4/10 |
| RU | 2666128 C1 * | 9/2018 | ............. | H04W 4/10 |
| WO | WO-2005025255 A1 * | 3/2005 | ............. | H04M 15/49 |
| WO | WO-2010117904 A1 * | 10/2010 | ............. | H04W 4/10 |
| WO | WO-2014085443 A1 * | 6/2014 | ............. | H04L 65/4061 |
| WO | WO-2016039579 A1 * | 3/2016 | ............. | H04W 4/08 |
| WO | WO-2016106593 A1 * | 7/2016 | ............. | H04W 4/10 |
| WO | WO-2016106600 A1 * | 7/2016 | ............. | H04W 4/10 |
| WO | WO-2016109953 A1 * | 7/2016 | ............. | H04L 12/14 |
| WO | WO-2016167553 A1 * | 10/2016 | ............. | H04L 29/06 |
| WO | WO-2017024470 A1 * | 2/2017 | ............. | H04W 72/04 |

(56) References Cited

FOREIGN PATENT DOCUMENTS

| WO | WO-2017051503 A1 | * | 3/2017 | ............ H04W 4/10 |
| WO | WO-2017054180 A1 | * | 4/2017 | ............ H04W 4/08 |
| WO | WO-2017057962 A1 | * | 4/2017 | ............ H04W 4/10 |
| WO | WO-2017126246 A1 | * | 7/2017 | ............ H04L 29/08 |
| WO | WO-2017142345 A1 | * | 8/2017 | ............ H04W 4/90 |
| WO | WO-2018078460 A1 | * | 5/2018 | ......... H04L 63/0876 |

OTHER PUBLICATIONS

3GPP Technical Specification 33.179, 3rd Generation Partnership Project; Technical Specification Group Services and System Aspects; Security of Mission Critical Push to Talk (MCPTT) over LTE; (Release 13), Version 13.2.0 (Year: 2016).*
"3rd Generation Partnership Project; Technical Specification Group Services and System Aspects; Group Communication System Enablers for LTE (GCSE_LTE); Stage 2 (Release 12)"; 3GPP TS 23.468 V12.3.0; Dec. 2014; 26 pages.
"3rd Generation Partnership Project; Technical Specification Group Radio Access Network; MBMS synchronisation protocol (SYNC) (Release 12)"; 3GPP TS 25.446 V12.1.0; Dec. 2014; 22 pages.
Huawei Technologies Co., Ltd. (Lizhiming), "MCPTT Discussion," S4-150114, 3GPP TSG-SA WG4 Meeting #82, Dubrovnik, Croatia, Jan. 26-30, 2015, ,9 pages.
3GPP TS 26346 V124.0 (Dec. 2014), 3rd Generation Partnership Project; Technical Specification Group Services and System Aspects; Multimedia Broadcast/Multicast Service (MBMS); Protocols and codecs (Release 12), 207 pages.
Ericsson LM, et al.,"MCPTT WID update," TD S4-150248, 3GPP TSG SA4 Meeting #82, Dubrovnik, Croatia, Jan. 26-30, 2015, 9 pages.

* cited by examiner

REAL-TIME TRANSPORT PROTOCOL RTP PACKET TRANSMISSION METHOD AND APPARATUS

CROSS-REFERENCE TO RELATED APPLICATIONS

This application is a continuation of International Application No. PCT/CN2015/074104, filed on Mar. 12, 2015, the disclosure of which is hereby incorporated by reference in its entirety.

TECHNICAL FIELD

The present application relates to the field of communications technologies, and in particular, to a Real-Time Transport Protocol RTP packet transmission method and apparatus.

BACKGROUND

A Long Term Evolution (LTE) group communications system is a special communications system with a scheduling capability. In a current LTE group communications system, information may be transmitted in two manners: unicast and multicast. Referring to FIG. 1, FIG. 1 is an architectural diagram of an existing LTE group communications system. A group communication service application server (GCS AS) transmits user data to user equipment (UE) based on the Real-Time Transport Protocol (RTP). A packet header of an RTP packet transmitted by the GCS AS to the UE includes synchronization source information of the GCS AS.

In the unicast transmission manner, the GCS AS sends an RTP packet to the UE by using a public data network (PDN) gateway (P-GW), a serving gateway (S-GW), and an evolved NodeB (eNB). After receiving the RTP packet, the UE obtains synchronization source information of the GCS AS by parsing a packet header, and adds the synchronization source information of the GCS AS to a trust list.

In the multicast transmission manner, the GCS AS first sends an RTP packet to a broadcast/multicast service center (BM-SC). After receiving the RTP packet from the GCS AS, the BM-SC changes synchronization source information of the GCS AS in the RTP packet into synchronization source information of the BM-SC, and then sends a changed RTP packet to the UE by using a Multimedia Broadcast Multicast Service gateway (MBMS GW) and an eNB. After receiving the RTP packet, the UE obtains the synchronization source information of the BM-SC by parsing a packet header, and adds the synchronization source information of the BM-SC to a trust list.

In the prior art, when UE is in an inactive Multimedia Broadcast Multicast Service (MBMS) coverage area, a GCS AS can send an RTP packet to the UE only in a unicast manner. When the UE is in an MBMS coverage area and a multicast condition is met, the GCS AS can send an RTP packet to the UE in a multicast manner.

However, assuming that the UE is moved from the non-MBMS coverage area to the MBMS overage area, a transmission manner may be switched from a unicast manner to a multicast manner. In a unicast process, the UE adds only synchronization source information of the GCS AS to a trust list. Therefore, when the UE receives an RTP packet sent by a BM-SC, because synchronization source information of the BM-SC that is included in the received RTP packet is not in the trust list, the UE may consider the RTP packet from the BM-SC as an invalid RTP packet and discard the RTP packet. In contrast, when the UE is moved from the MBMS coverage area to the non-MBMS overage area, the UE adds only the synchronization source information of the BM-SC to the trust list. Therefore, when the UE receives an RTP packet sent by the GCS AS, because synchronization source information of the GCS AS that is included in the received RTP packet is not in the trust list, the UE may consider, as an invalid RTP packet, the RTP packet transmitted by the GCS AS in a unicast manner and discard the RTP packet. Therefore, in the prior art, after a transmission manner is switched between a unicast manner and a multicast manner, a technical problem that the UE discontinuously receives RTP packets may be caused.

SUMMARY

Embodiments of the present disclosure provide a Real-Time Transport Protocol RTP packet transmission method and apparatus. Therefore, a GCS AS or a BM-SC provides synchronization source information of the GCS AS and synchronization source information of the BM-SC for UE, so that the UE can continuously receive RTP packets.

A first aspect of this application provides a Real-Time Transport Protocol RTP packet transmission method, including:

obtaining, by a group communication service application server GCS AS, synchronization source information of a broadcast/multicast service center BM-SC; and providing, by the GCS AS for user equipment UE, the synchronization source information of the BM-SC or synchronization source reference information of the BM-SC, and an RTP packet that includes synchronization source information of the GCS AS, so that the UE obtains and saves the synchronization source information of the BM-SC and the synchronization source information of the GCS AS in a trust list of the UE, where the synchronization source reference information of the BM-SC is information determined according to the synchronization source information of the BM-SC and the synchronization source information of the GCS AS.

With reference to the first aspect, in a first possible implementation of the first aspect, the providing, by the GCS AS for user equipment UE, the synchronization source information of the BM-SC or synchronization source reference information of the BM-SC, and an RTP packet that includes synchronization source information of the GCS AS, so that the UE obtains and saves the synchronization source information of the BM-SC and the synchronization source information of the GCS AS in a trust list of the UE includes:

providing, by the GCS AS for the UE, the synchronization source reference information of the BM-SC and the RTP packet that includes the synchronization source information of the GCS AS, so that the UE obtains the synchronization source information of the BM-SC according to the synchronization source information of the GCS AS and the synchronization source reference information of the BM-SC, and saves the synchronization source information of the BM-SC and the synchronization source information of the GCS AS in the trust list of the UE.

With reference to the first aspect or the first possible implementation of the first aspect, in a second possible implementation of the first aspect, the synchronization source information of the BM-SC includes a synchronization data source SSRC identifier of the BM-SC, a sequence number SN10 of an RTP packet sent by the BM-SC, and a timestamp of the BM-SC;

the synchronization source information of the GCS AS includes an SSRC identifier of the GCS AS, a sequence number SN20 of an RTP packet sent by the GCS AS, and a timestamp of the GCS AS; and the providing, by the GCS AS for the UE, the synchronization source reference information of the BM-SC and the RTP packet that includes the synchronization source information of the GCS AS includes:

determining, by the GCS AS, RTP packet sequence number reference information and timestamp reference information according to the synchronization source information of the BM-SC and the synchronization source information of the GCS AS, where the RTP packet sequence number reference information is a difference between the sequence number SN10 of the RTP packet sent by the BM-SC and the sequence number SN20 of the RTP packet sent by the GCS AS, and the timestamp reference information is a difference between the timestamp of the BM-SC and the timestamp of the GCS AS; and obtaining, by the GCS AS, the synchronization source reference information that is of the BM-SC and that includes the SSRC identifier of the BM-SC, the RTP packet sequence number reference information, and the timestamp reference information.

With reference to any one of the first aspect, the first possible implementation of the first aspect, or the second possible implementation of the first aspect, in a third possible implementation of the first aspect, the obtaining, by a group communication service application server GCS AS, synchronization source information of a broadcast/multicast service center BM-SC includes:

receiving, by the GCS AS, active Multimedia Broadcast Multicast Service MBMS status indication information sent by the BM-SC, where the active MBMS status indication information includes the synchronization source information of the BM-SC, and obtaining the synchronization source information of the BM-SC from the active MBMS status indication information; or receiving, by the GCS AS, the synchronization source information of the BM-SC that is sent by the BM-SC; or receiving, by the GCS AS, an RTP Control Protocol RTCP packet that is sent by the BM-SC and that includes the synchronization source information of the BM-SC, and obtaining the synchronization source information of the BM-SC from the RTCP packet.

With reference to the third possible implementation of the first aspect, in a fourth possible implementation of the first aspect, the providing, by the GCS AS for user equipment UE, the synchronization source information of the BM-SC or synchronization source reference information of the BM-SC, and an RTP packet that includes synchronization source information of the GCS AS includes:

sending, by the GCS AS, SIP information to the UE by using a Session Initiation Protocol SIP procedure, where the SIP information includes the synchronization source information of the BM-SC or the synchronization source reference information of the BM-SC.

With reference to the third possible implementation of the first aspect, in a fifth possible implementation of the first aspect, the providing, by the GCS AS for user equipment UE, the synchronization source information of the BM-SC or synchronization source reference information of the BM-SC, and an RTP packet that includes synchronization source information of the GCS AS includes:

sending, by the GCS AS, the RTP packet to the UE, where packet header information of the RTP packet includes the synchronization source information of the BM-SC or the synchronization source reference information of the BM-SC, and the packet header information further includes the synchronization source information of the GCS AS.

A second aspect of this application provides a Real-Time Transport Protocol RTP packet transmission method, including:

obtaining, by a broadcast/multicast service center BM-SC, synchronization source information of a group communication service application server GCS AS; and providing, by the BM-SC for user equipment UE, the synchronization source information of the GCS AS or synchronization source reference information of the GCS AS, and an RTP packet that includes synchronization source information of the BM-SC, so that the UE obtains and saves the synchronization source information of the BM-SC and the synchronization source information of the GCS AS in a trust list of the UE, where the synchronization source reference information of the GCS AS is information determined according to the synchronization source information of the GCS AS and the synchronization source information of the BM-SC.

With reference to the second aspect, in a first possible implementation of the second aspect, the providing, by the BM-SC for user equipment UE, the synchronization source information of the GCS AS or synchronization source reference information of the GCS AS, and an RTP packet that includes synchronization source information of the BM-SC, so that the UE obtains and saves the synchronization source information of the BM-SC and the synchronization source information of the GCS AS in a trust list of the UE includes:

providing, by the BM-SC for the UE, the synchronization source reference information of the GCS AS and the RTP packet that includes the synchronization source information of the BM-SC, so that the UE obtains the synchronization source information of the GCS AS according to the synchronization source information of the BM-SC and the synchronization source reference information of the GCS AS, and saves the synchronization source information of the BM-SC and the synchronization source information of the GCS AS in the trust list of the UE.

With reference to the second aspect or the first possible implementation of the second aspect, in a second possible implementation of the second aspect, the synchronization source information of the BM-SC includes a synchronization data source SSRC identifier of the BM-SC, a sequence number SN10 of an RTP packet sent by the BM-SC, and a timestamp of the BM-SC;

the synchronization source information of the GCS AS includes an SSRC identifier of the GCS AS, a sequence number SN20 of an RTP packet sent by the GCS AS, and a timestamp of the GCS AS; and the providing, by the BM-SC for the user equipment UE, the synchronization source reference information of the GCS AS and the RTP packet that includes the synchronization source information of the BM-SC includes:

determining, by the BM-SC, RTP packet sequence number reference information and timestamp reference information according to the synchronization source information of the BM-SC and the synchronization source information of the GCS AS, where the RTP packet sequence number reference information is a difference between the sequence number SN10 of the RTP packet sent by the BM-SC and the sequence number SN20 of the RTP packet sent by the GCS AS, and the timestamp reference information is a difference between the timestamp of the BM-SC and the timestamp of the GCS AS; and obtaining, by the BM-SC, the synchronization source reference information that is of the GCS AS and that includes the SSRC identifier of the GCS AS, the RTP packet sequence number reference information, and the timestamp reference information.

With reference to any one of the second aspect, the first possible implementation of the second aspect, or the second possible implementation of the second aspect, in a third possible implementation of the second aspect, the obtaining, by a broadcast/multicast service center BM-SC, synchronization source information of a group communication service application server GCS AS includes:

receiving, by the BM-SC, MBMS bearer request information sent by the GCS AS, where the MBMS bearer request information includes the synchronization source information of the GCS AS, and obtaining the synchronization source information of the GCS AS from the MBMS bearer request information; or receiving, by the BM-SC, an RTP packet that is sent by the GCS AS and that includes the synchronization source information of the GCS AS, and obtaining the synchronization source information of the GCS AS from the RTP packet that includes the synchronization source information of the GCS AS.

With reference to the third possible implementation of the second aspect, in a fourth possible implementation of the second aspect, the providing, by the BM-SC for user equipment UE, the synchronization source information of the GCS AS or synchronization source reference information of the GCS AS, and an RTP packet that includes synchronization source information of the BM-SC includes:

sending, by the BM-SC, a user service description USD parameter to the UE, where the USD parameter includes the synchronization source information of the GCS AS or the synchronization source reference information of the GCS AS.

With reference to the third possible implementation of the second aspect, in a fifth possible implementation of the second aspect, the providing, by the BM-SC for user equipment UE, the synchronization source information of the GCS AS or synchronization source reference information of the GCS AS, and an RTP packet that includes synchronization source information of the BM-SC includes:

sending, by the BM-SC, the RTP packet to the UE, where user data or packet header information of the RTP packet includes the synchronization source information of the GCS AS or the synchronization source reference information of the GCS AS, and the packet header information further includes the synchronization source information of the BM-SC.

A third aspect of this application provides a synchronization source information obtaining method, including:

receiving, by user equipment UE, synchronization source information of a second network side device that is sent by a first network side device or synchronization source reference information of a second network side device that is sent by a first network side device, and a Real-Time Transport Protocol RTP packet that is sent by the first network side device and that includes synchronization source information of the first network side device, to obtain the synchronization source information of the first network side device and the synchronization source information of the second network side device; and saving, by the UE, both the synchronization source information of the first network side device and the synchronization source information of the second network side device in a trust list of the UE, where the synchronization source reference information of the second network side device is information determined according to the synchronization source information of the first network side device and the synchronization source information of the second network side device; and the first network side device is a broadcast/multicast service center BM-SC and the second network side device is a group communication service application server GCS AS, or the first network side device is a GCS AS and the second network side device is a BM-SC.

With reference to the third aspect, in a first possible implementation of the third aspect, the receiving, by user equipment UE, synchronization source information of a second network side device that is sent by a first network side device or synchronization source reference information of a second network side device that is sent by a first network side device, and a Real-Time Transport Protocol RTP packet that is sent by the first network side device and that includes synchronization source information of the first network side device, to obtain the synchronization source information of the first network side device and the synchronization source information of the second network side device includes:

receiving, by the UE, the RTP packet that includes the synchronization source information of the first network side device, to obtain the synchronization source information of the first network side device and the synchronization source reference information of the second network side device; and determining, by the UE, the synchronization source information of the second network side device according to the synchronization source information of the first network side device and the synchronization source reference information of the second network side device.

A fourth aspect of this application provides a Real-Time Transport Protocol RTP packet transmission apparatus, including:

a first obtaining unit, configured to obtain synchronization source information of a broadcast/multicast service center BM-SC; and a first sending unit, configured to provide, for user equipment UE, the synchronization source information of the BM-SC or synchronization source reference information of the BM-SC, and an RTP packet that includes synchronization source information of a group communication service application server GCS AS, so that the UE obtains and saves the synchronization source information of the BM-SC and the synchronization source information of the GCS AS in a trust list of the UE, where the synchronization source reference information of the BM-SC is information determined according to the synchronization source information of the BM-SC and the synchronization source information of the GCS AS.

With reference to the fourth aspect, in a first possible implementation of the fourth aspect, the first sending unit is configured to:

provide, for the UE, the synchronization source reference information of the BM-SC and the RTP packet that includes the synchronization source information of the GCS AS, so that the UE obtains the synchronization source information of the BM-SC according to the synchronization source information of the GCS AS and the synchronization source reference information of the BM-SC, and saves the synchronization source information of the BM-SC and the synchronization source information of the GCS AS in the trust list of the UE.

With reference to the fourth aspect or the first possible implementation of the fourth aspect, in a second possible implementation of the fourth aspect, the synchronization source information of the BM-SC includes a synchronization data source SSRC identifier of the BM-SC, a sequence number SN10 of an RTP packet sent by the BM-SC, and a timestamp of the BM-SC;

the synchronization source information of the GCS AS includes an SSRC identifier of the GCS AS, a sequence number SN20 of an RTP packet sent by the GCS AS, and a timestamp of the GCS AS; and the first sending unit is configured to:

determine RTP packet sequence number reference information and timestamp reference information according to the synchronization source information of the BM-SC and the synchronization source information of the GCS AS, where the RTP packet sequence number reference information is a difference between the sequence number SN10 of the RTP packet sent by the BM-SC and the sequence number SN20 of the RTP packet sent by the GCS AS, and the timestamp reference information is a difference between the timestamp of the BM-SC and the timestamp of the GCS AS; and obtain the synchronization source reference information that is of the BM-SC and that includes the SSRC identifier of the BM-SC, the RTP packet sequence number reference information, and the timestamp reference information.

With reference to any one of the fourth aspect, the first possible implementation of the fourth aspect, or the second possible implementation of the fourth aspect, in a third possible implementation of the fourth aspect, the first obtaining unit is configured to:

receive active Multimedia Broadcast Multicast Service MBMS status indication information sent by the BM-SC, where the active MBMS status indication information includes the synchronization source information of the BM-SC, and obtain the synchronization source information of the BM-SC from the active MBMS status indication information; or receive the synchronization source information of the BM-SC that is sent by the BM-SC; or receive an RTP Control Protocol RTCP packet that is sent by the BM-SC and that includes the synchronization source information of the BM-SC, and obtain the synchronization source information of the BM-SC from the RTCP packet.

With reference to the third possible implementation of the fourth aspect, in a fourth possible implementation of the fourth aspect, the first sending unit is configured to:

send SIP information to the UE by using a Session Initiation Protocol SIP procedure, where the SIP information includes the synchronization source information of the BM-SC or the synchronization source reference information of the BM-SC.

With reference to the third possible implementation of the fourth aspect, in a fifth possible implementation of the fourth aspect, the first sending unit is configured to:

send the RTP packet to the UE, where packet header information of the RTP packet includes the synchronization source information of the BM-SC or the synchronization source reference information of the BM-SC, and the packet header information further includes the synchronization source information of the GCS AS.

A fifth aspect of this application provides a Real-Time Transport Protocol RTP packet transmission apparatus, including:

a second obtaining unit, configured to obtain synchronization source information of a group communication service application server GCS AS; and a second sending unit, configured to provide, for user equipment UE, the synchronization source information of the GCS AS or synchronization source reference information of the GCS AS, and an RTP packet that includes synchronization source information of a broadcast/multicast service center BM-SC, so that the UE obtains and saves the synchronization source information of the BM-SC and the synchronization source information of the GCS AS in a trust list of the UE, where the synchronization source reference information of the GCS AS is information determined according to the synchronization source information of the GCS AS and the synchronization source information of the BM-SC.

With reference to the fifth aspect, in a first possible implementation of the fifth aspect, the second sending unit is configured to:

provide, for the UE, the synchronization source reference information of the GCS AS and the RTP packet that includes the synchronization source information of the BM-SC, so that the UE obtains the synchronization source information of the GCS AS according to the synchronization source information of the BM-SC and the synchronization source reference information of the GCS AS, and saves the synchronization source information of the BM-SC and the synchronization source information of the GCS AS in the trust list of the UE.

With reference to the fifth aspect or the first possible implementation of the fifth aspect, in a second possible implementation of the fifth aspect, the synchronization source information of the BM-SC includes a synchronization data source SSRC identifier of the BM-SC, a sequence number SN10 of an RTP packet sent by the BM-SC, and a timestamp of the BM-SC;

the synchronization source information of the GCS AS includes an SSRC identifier of the GCS AS, a sequence number SN20 of an RTP packet sent by the GCS AS, and a timestamp of the GCS AS; and the second sending unit is configured to:

determine RTP packet sequence number reference information and timestamp reference information according to the synchronization source information of the BM-SC and the synchronization source information of the GCS AS, where the RTP packet sequence number reference information is a difference between the sequence number SN10 of the RTP packet sent by the BM-SC and the sequence number SN20 of the RTP packet sent by the GCS AS, and the timestamp reference information is a difference between the timestamp of the BM-SC and the timestamp of the GCS AS; and obtain the synchronization source reference information that is of the GCS AS and that includes the SSRC identifier of the GCS AS, the RTP packet sequence number reference information, and the timestamp reference information.

With reference to any one of the fifth aspect, the first possible implementation of the fifth aspect, or the second possible implementation of the fifth aspect, in a third possible implementation of the fifth aspect, the second obtaining unit is configured to:

receive MBMS bearer request information sent by the GCS AS, where the MBMS bearer request information includes the synchronization source information of the GCS AS, and obtain the synchronization source information of the GCS AS from the MBMS bearer request information; or receive an RTP packet that is sent by the GCS AS and that includes the synchronization source information of the GCS AS, and obtain the synchronization source information of the GCS AS from the RTP packet that includes the synchronization source information of the GCS AS.

With reference to the third possible implementation of the fifth aspect, in a fourth possible implementation of the fifth aspect, the second sending unit is configured to:

send a user service description USD parameter to the UE, where the USD parameter includes the synchronization source information of the GCS AS or the synchronization source reference information of the GCS AS.

With reference to the third possible implementation of the fifth aspect, in a fifth possible implementation of the fifth aspect, the second sending unit is configured to:

send the RTP packet to the UE, where user data or packet header information of the RTP packet includes the synchronization source information of the GCS AS or the synchronization source reference information of the GCS AS, and the packet header information further includes the synchronization source information of the BM-SC.

With reference to the fourth possible implementation of the fifth aspect, in a sixth possible implementation of the fifth aspect, the second sending unit is configured to:

send the USD parameter to the GCS AS, so that the GCS AS sends the USD parameter to the UE in a unicast transmission manner; or send the USD parameter to the GCS AS, so that the GCS AS sends the USD parameter to the UE by using a SIP procedure.

A sixth aspect of this application provides a synchronization source information obtaining apparatus, including:

a third obtaining unit, configured to receive synchronization source information of a second network side device that is sent by a first network side device or synchronization source reference information of a second network side device that is sent by a first network side device, and a Real-Time Transport Protocol RTP packet that is sent by the first network side device and that includes synchronization source information of the first network side device, to obtain the synchronization source information of the first network side device and the synchronization source information of the second network side device; and a storage unit, configured to save both the synchronization source information of the first network side device and the synchronization source information of the second network side device in a trust list of the UE, where the synchronization source reference information of the second network side device is information determined according to the synchronization source information of the first network side device and the synchronization source information of the second network side device; and the first network side device is a broadcast/multicast service center BM-SC and the second network side device is a group communication service application server GCS AS, or the first network side device is a GCS AS and the second network side device is a BM-SC.

With reference to the sixth aspect, in a first possible implementation of the sixth aspect, the third obtaining unit is configured to:

receive the RTP packet that includes the synchronization source information of the first network side device, to obtain the synchronization source information of the first network side device and the synchronization source reference information of the second network side device; and determine the synchronization source information of the second network side device according to the synchronization source information of the first network side device and the synchronization source reference information of the second network side device.

With reference to the first possible implementation of the sixth aspect, in a second possible implementation of the sixth aspect, the synchronization source information of the first network side device includes an SSRC identifier of the first network side device, a sequence number SN10 of an RTP packet sent by the first network side device, and a timestamp of the first network side device;

the synchronization source information of the second network side device includes an SSRC identifier of the second network side device, a sequence number SN20 of an RTP packet sent by the second network side device, and a timestamp of the second network side device;

the synchronization source reference information of the second network side device includes the SSRC identifier of the second network side device, RTP packet sequence number reference information, and timestamp reference information, where the RTP packet sequence number reference information is a difference between the sequence number SN10 of the RTP packet sent by the first network side device and the sequence number SN20 of the RTP packet sent by the second network side device, and the timestamp reference information is a difference between the timestamp of the first network side device and the timestamp of the second network side device; and the third obtaining unit is configured to:

obtain the SSRC identifier of the second network side device from the synchronization source reference information of the second network side device;

determine, according to the RTP packet sequence number reference information in the synchronization source reference information of the second network side device, and the sequence number SN10 of the RTP packet sent by the first network side device, the sequence number SN20 of the RTP packet sent by the second network side device; and determine the timestamp of the second network side device according to the timestamp reference information in the synchronization source reference information of the second network side device, and the timestamp of the first network side device.

With reference to the first possible implementation of the sixth aspect or the second possible implementation of the sixth aspect, in a third possible implementation of the sixth aspect, the third obtaining unit is configured to:

receive SIP information sent by the first network side device to the UE by using a Session Initiation Protocol SIP procedure, where the SIP information includes the synchronization source information of the second network side device or the synchronization source reference information of the second network side device, the first network side device is the GCS AS, and the second network side device is the BM-SC; or receive the RTP packet sent by the first network side device, where packet header information of the RTP packet includes the synchronization source information of the second network side device or the synchronization source reference information of the second network side device, the packet header information further includes the synchronization source information of the first network side device, the first network side device is the GCS AS, and the second network side device is the BM-SC; or receive a user service description USD parameter sent by the first network side device, where the USD parameter includes the synchronization source information of the second network side device or the synchronization source reference information of the second network side device, the first network side device is the BM-SC, and the second network side device is the GCS AS; or receive the RTP packet sent by the first network side device, where user data or packet header information of the RIP packet includes the synchronization source information of the second network side device or the synchronization source reference information of the second network side device, the packet header information further includes the synchronization source information of the first network side device, the first network side device is the BM-SC, and the second network side device is the GCS AS.

A seventh aspect of this application provides a group communication service application server GCS AS, including:

a receiver, configured to obtain synchronization source information of a broadcast/multicast service center BM-SC; and a transmitter, configured to provide, for user equipment UE, the synchronization source information of the BM-SC or synchronization source reference information of the BM-SC, and an RTP packet that includes synchronization source information of the GCS AS, so that the UE obtains and saves the synchronization source information of the BM-SC and the synchronization source information of the GCS AS in a trust list of the UE, where the synchronization source reference information of the BM-SC is information determined according to the synchronization source information of the BM-SC and the synchronization source information of the GCS AS.

An eighth aspect of this application provides a broadcast/multicast service center BM-SC, including:

a receiver, configured to obtain synchronization source information of a group communication service application server GCS AS; and a transmitter, configured to provide, for user equipment UE, the synchronization source information of the GCS AS or synchronization source reference information of the GCS AS, and an RTP packet that includes synchronization source information of the BM-SC, so that the UE obtains and saves the synchronization source information of the BM-SC and the synchronization source information of the GCS AS in a trust list of the UE, where the synchronization source reference information of the GCS AS is information determined according to the synchronization source information of the GCS AS and the synchronization source information of the BM-SC.

A ninth aspect of this application provides user equipment UE, including:

a receiver, configured to receive synchronization source information of a second network side device that is sent by a first network side device or synchronization source reference information of a second network side device that is sent by a first network side device, and a Real-Time Transport Protocol RTP packet that is sent by the first network side device and that includes synchronization source information of the first network side device; and a processor, configured to: obtain the synchronization source information of the first network side device and the synchronization source information of the second network side device, and save both the synchronization source information of the first network side device and the synchronization source information of the second network side device in a trust list of the UE, where the synchronization source reference information of the second network side device is information determined according to the synchronization source information of the first network side device and the synchronization source information of the second network side device; and the first network side device is a broadcast/multicast service center BM-SC and the second network side device is a group communication service application server GCS AS, or the first network side device is a GCS AS and the second network side device is a BM-SC.

One or more technical solutions provided in the embodiments of the present disclosure have at least the following technical effects or advantages:

In the embodiments of the present disclosure, a GCS AS obtains synchronization source information of a BM-SC, and the GCS AS provides, for user equipment UE, the synchronization source information of the BM-SC or synchronization source reference information of the BM-SC, and an RTP packet that includes synchronization source information of the GCS AS, so that the UE obtains and saves the synchronization source information of the BM-SC and the synchronization source information of the GCS AS in a trust list of the UE. Alternatively, a BM-SC obtains synchronization source information of a GCS AS, and the BM-SC provides, for user equipment UE, the synchronization source information of the GCS AS or synchronization source reference information of the GCS AS, and an RTP packet that includes synchronization source information of the BM-SC, so that the UE obtains and saves the synchronization source information of the BM-SC and the synchronization source information of the GCS AS in a trust list of the UE. Therefore, in the embodiments of the present disclosure, on one hand, the GCS AS (or the BM-SC) may provide the synchronization source information of the GCS AS (or the synchronization source information of the BM-SC) for the UE by sending the RTP packet. On the other hand, the GCS AS (or the BM-SC) further provides the synchronization source information of the BM-SC (or the synchronization source information of the GCS AS) for the UE. Therefore, when being in a unicast (multicast) transmission manner, the UE can not only obtain the synchronization source information of the GCS AS (or the synchronization source information of the BM-SC), but also can obtain the synchronization source information of the BM-SC (or the synchronization source information of the GCS AS). Therefore, regardless of whether the UE is currently in a unicast transmission manner or a multicast transmission manner, the UE can save the two pieces of synchronization source information in the trust list of the UE. In this way, after an RTP packet transmission manner is switched between a unicast manner and a multicast manner, the two pieces of synchronization source information are saved in the trust list of the UE. Therefore, regardless of whether the GCS AS or the BM-SC transmits an RTP packet after the switching, the UE can identify and trust the received RTP packet, so as to continuously receive RTP packets.

DESCRIPTION OF EMBODIMENTS

Embodiments of the present disclosure provide a Real-Time Transport Protocol (RTP) packet transmission method and apparatus. Therefore, a GCS AS or a BM-SC provides synchronization source information of the GCS AS and synchronization source information of the BM-SC for UE, so that the UE can continuously receive RTP packets.

To resolve the foregoing technical problem, solution ideas of the technical solutions provided in the present disclosure are as follows:

In the embodiments of the present disclosure, on one hand, a GCS AS (or a BM-SC) may provide synchronization source information of the GCS AS (or synchronization source information of the BM-SC) for UE by sending an RTP packet. On the other hand, the GCS AS (or the BM-SC) further provides the synchronization source information of the BM-SC (or the synchronization source information of the GCS AS) for the UE. Therefore, when being in a unicast (multicast) transmission manner, the UE can not only obtain the synchronization source information of the GCS AS (or the synchronization source information of the BM-SC), but also can obtain the synchronization source information of the BM-SC (or the synchronization source information of the GCS AS). Therefore, regardless of whether the UE is currently in a unicast transmission manner or a multicast transmission manner, the UE can save the two pieces of synchronization source information in a trust list of the UE. In this way, after an RTP packet transmission manner is switched between a unicast manner and a multicast manner, the two pieces of synchronization source information are saved in the trust list of the UE. Therefore, regardless of whether the GCS AS or the BM-SC transmits an RTP packet after the switching, the UE can identify and trust the received RTP packet, so as to continuously receive RTP packets.

Figure 1:
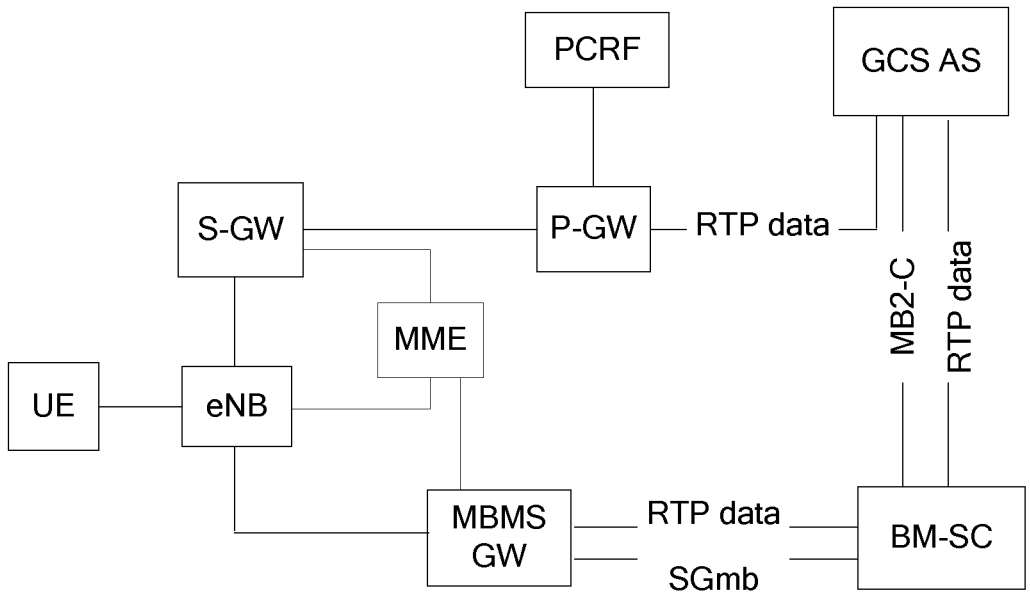
FIG. 1 is an architectural diagram of an LTE group communications system.

The embodiments of the present disclosure provide a Real-Time Transport Protocol RTP packet transmission method. Referring to FIG. 1, FIG. 1 is a possible LTE communications system architecture applicable to the RTP packet transmission method in the embodiments. The communications system architecture includes a terminal (English: User Equipment, UE), a GCS AS, a BM-SC, a P-GW, a policy and charging rules function (PCRF), an S-GW, an MBMS GW, and an evolved NodeB (Evolutional NodeB, eNB or e-NodeB). A mobility management entity (MME) mainly provides functions such as MBMS session management participation. In the embodiments of the present disclosure, the UE may be specifically a mobile phone, a smartwatch, or the like. This is not specifically limited in this application. The GCS AS is a group communication service application server and mainly responsible for functions such as group member management and MBMS initiation. The BM-SC is a broadcast/multicast service center, belongs to a network element at a service layer, and is an ingress for a content provider. The BM-SC provides service convergence and sending, user authorization, MBMS service bearer establishment and initiation, session control initiation, and the like, and may further implement synchronization with a base station.

Figure 2:
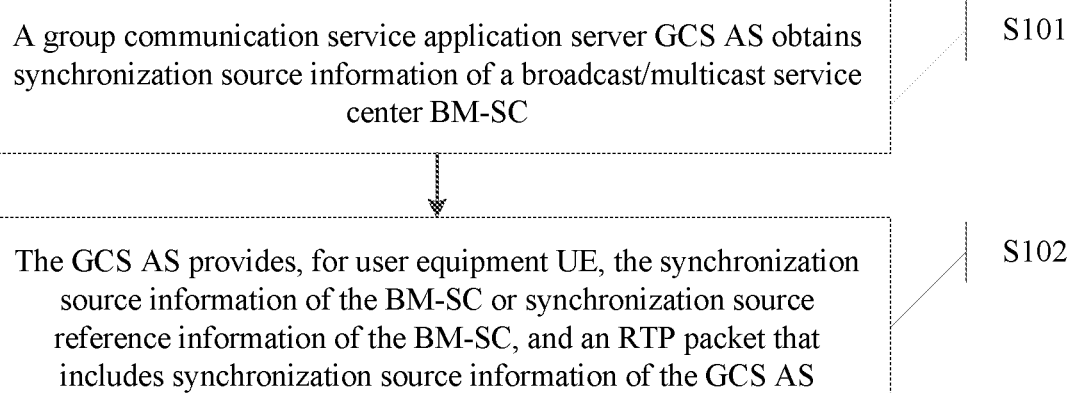
FIG. 2 is a flowchart of an RTP packet transmission method according to an embodiment of the present disclosure.
Figure 3:
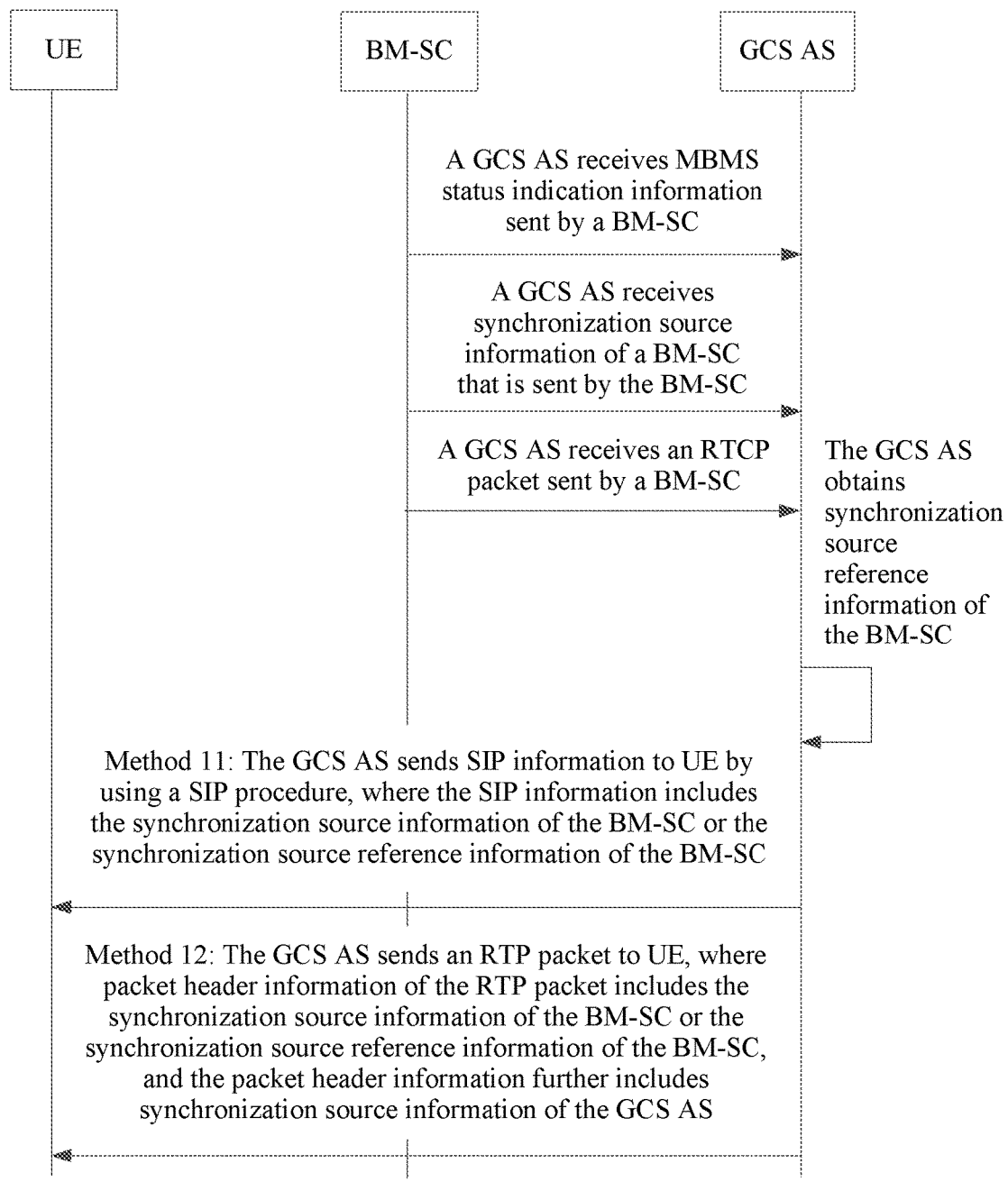
FIG. 3 is a schematic diagram of interaction among a GCS AS, a BM-SC, and UE according to an embodiment of the present disclosure.

A first aspect of this application first describes an RTP packet transmission method in an embodiment from a GCS AS side. Referring to FIG. 2 and FIG. 3, the method includes the following steps:

S101. A group communication service application server GCS AS obtains synchronization source information of a broadcast/multicast service center BM-SC.

S102. The GCS AS provides, for user equipment UE, the synchronization source information of the BM-SC or synchronization source reference information of the BM-SC, and an RTP packet that includes synchronization source information of the GCS AS.

The GCS AS first obtains the synchronization source information of the BM-SC in S101, and provides the synchronization source information of the BM-SC for the UE in S102. In addition, the GCS AS further sends the RTP packet to the UE. The RTP packet includes the synchronization source information of the GCS AS. Therefore, the UE can obtain the synchronization source information of the GCS AS by parsing the RTP packet. Therefore, in this embodiment of the present disclosure, the GCS AS may provide the synchronization source information of the GCS AS and the synchronization source information of the BM-SC for the UE, so that the UE can save both the two pieces of synchronization source information in a trust list of the UE.

In this embodiment of the present disclosure, the synchronization source information of the BM-SC includes but is not limited to a synchronization source (SSRC) identifier of the BM-SC, a sequence number SN10 of an RTP packet sent by the BM-SC, and a timestamp of the BM-SC. The synchronization source information of the GCS AS includes but is not limited to an SSRC identifier of the GCS AS, a sequence number SN20 of an RTP packet sent by the GCS AS, and a timestamp of the GCS AS.

An SSRC identifier is a synchronization data source identifier and used to identify a synchronization data source of an RTP packet. A timestamp (Timestamp) is mainly used to identify a sending time of an RTP packet. A contributing source (CSRC) identifier is used to identify a contributing source of valid content in an RTP packet. Synchronization source information trusted by the UE is recorded in the trust list of the UE. In RTP packet reception, the trust list of the UE is used to help the UE determine whether a synchronization source of an RTP packet is valid.

In addition, in this embodiment of the present disclosure, when providing the synchronization source information of the BM-SC for the UE, the GCS AS may directly provide the synchronization source information of the BM-SC for the UE, or may provide the synchronization source reference information of the BM-SC for the UE. The synchronization source reference information of the BM-SC is information determined by the GCS AS according to the received synchronization source information of the BM-SC and the synchronization source information of the GCS AS. The synchronization source reference information of the BM-SC is corresponding to the synchronization source information of the BM-SC.

Specifically, when the GCS AS provides the synchronization source reference information of the BM-SC for the UE, that the GCS AS provides, for the UE, the synchronization source reference information of the BM-SC and the RTP packet that includes the synchronization source information of the GCS AS includes:

determining, by the GCS AS, RTP packet sequence number reference information and timestamp reference information according to the synchronization source information of the BM-SC and the synchronization source information of the GCS AS, where the RTP packet sequence number reference information is a difference between the sequence number SN10 of the RTP packet sent by the BM-SC and the sequence number SN20 of the RTP packet sent by the GCS AS, and the timestamp reference information is a difference between the timestamp of the BM-SC and the timestamp of the GCS AS; and obtaining, by the GCS AS, the synchronization source reference information that is of the BM-SC and that includes the SSRC identifier of the BM-SC, the RTP packet sequence number reference information, and the timestamp reference information.

In a specific implementation process, the BM-SC and the GCS AS may differ in RTP packet scheduling. For example, a sequence number SN10 of the first RTP packet sent by the GCS AS is 3, and subsequently, each time an RTP packet is sent, a sequence number of the RTP packet is obtained by increasing a sequence number of a previous RTP packet by 1; and a sequence number SN20 of the first RTP packet sent by the BM-SC is 5, and subsequently, each time an RTP packet is sent, a sequence number of the RTP packet is obtained by increasing a sequence number of a previous RTP packet by 1.

Therefore, the GCS AS needs to determine a relationship between the SN10 and the SN20, that is, a difference between the SN10 and the SN20. Then, the GCS AS uses the difference between the SN10 and the SN20 as the RTP packet sequence number reference information.

To avoid a calculation error, for example, avoid using, as the RTP packet sequence number reference information, a difference between a sequence number of the second RTP packet sent by the GCS AS and a sequence number of the first RTP packet sent by the BM-SC, in this embodiment of the present disclosure, the SN10 is a sequence number of an initial RTP packet sent by the GCS AS, that is, a sequence number of the first RTP packet sent by the GCS AS, and the SN20 is a sequence number of an initial RTP packet sent by the BM-SC, that is, a sequence number of the first RTP packet sent by the BM-SC. In a specific implementation process, the difference between the SN10 and the SN20 may be SN10−SN20, or may be SN20−SN10. This is not specifically limited in this application. In this embodiment of the present disclosure, SN10−SN20 is used as an example for description.

Similarly, the timestamp reference information also needs to be obtained by means of subtraction between the timestamp of the BM-SC and the timestamp of the GCS AS. In this embodiment of the present disclosure, subtraction is still performed between a timestamp at which the BM-SC sends the first RTP packet and a timestamp at which the GCS AS sends the first RTP packet. In addition, in a specific implementation process, the timestamp of the GCS AS may be subtracted from the timestamp of the BM-SC, or the timestamp of the BM-SC may be subtracted from the timestamp of the GCS AS. This is not specifically limited in the present disclosure. Description is provided in the following by using an example in which the timestamp of the GCS AS is subtracted from the timestamp of the BM-SC.

For example, assuming that a sequence number SN10 of the first RTP packet sent by the BM-SC is 5, a timestamp t1 at which the BM-SC sends the first RTP packet is 15, a sequence number SN20 of the first RTP packet sent by the GCS AS is 3, and a timestamp t2 at which the GCS AS sends the first RTP packet is 10, SN10−SN20=2, and t1−t2=5. Therefore, the RTP packet sequence number reference information is 2, and the timestamp reference information is 5.

Finally, the GCS AS uses the SSRC identifier of the BM-SC, the timestamp reference information, and the RTP packet sequence number reference information as the synchronization source reference information of the BM-SC, so as to obtain the synchronization source reference information that is of the BM-SC and that includes the SSRC identifier of the BM-SC, the RTP packet sequence number reference information, and the timestamp reference information.

Then, in S102, the GCS AS provides the synchronization source reference information of the BM-SC for the UE, so that the UE can obtain the synchronization source information of the BM-SC according to both the synchronization source reference information of the BM-SC and the synchronization source information of the GCS AS that is obtained from the RTP packet. Finally, the UE saves both the two pieces of synchronization source information in the trust list of the UE.

Therefore, after an RTP packet transmission manner is switched from a unicast manner to a multicast manner, or is switched from a multicast manner to a unicast manner, two pieces of synchronization source information are saved in a trust list of UE. Therefore, regardless of whether a BM-SC or a GCS AS transmits an RTP packet after the switching, the UE can identify the RTP packet, so as to continuously receive RTP packets.

In this embodiment of the present disclosure, the GCS AS obtains the synchronization source information of the BM-SC in S101 in several manners, specifically including:

receiving, by the GCS AS, active Multimedia Broadcast Multicast Service MBMS status indication information sent by the BM-SC, where the active MBMS status indication information includes the synchronization source information of the BM-SC, and obtaining the synchronization source information of the BM-SC from the active MBMS status indication information; or receiving, by the GCS AS, the synchronization source information of the BM-SC that is sent by the BM-SC; or receiving, by the GCS AS, an RTP Control Protocol (RTCP for short) packet that is sent by the BM-SC and that includes the synchronization source information of the BM-SC, and obtaining the synchronization source information of the BM-SC from the RTCP packet.

Specifically, the BM-SC reports the active MBMS status indication information to the GCS AS by using an MBMS status indication report procedure. Therefore, the BM-SC may add the synchronization source information of the BM-SC to the active MBMS status indication information, to provide the synchronization source information of the BM-SC for the GCS AS.

After receiving the active MBMS status indication information, the GCS AS parses the active MBMS status indication information to obtain the synchronization source information of the BM-SC from a parsing result.

Alternatively, the BM-SC may report the synchronization source information of the BM-SC by using a dedicated BM-SC report procedure. In this embodiment of the present disclosure, the BM-SC report procedure includes a step, that is, the BM-SC reports the synchronization source information of the BM-SC to the GCS AS by using an MB2 interface. Then, the GCS AS receives, by using the MB2 interface, the synchronization source information of the BM-SC that is reported by the BM-SC.

In addition to the foregoing two methods, the BM-SC may send an RTCP packet to the GCS AS. Because the RTCP packet carries the synchronization source information of the BM-SC, the GCS AS can obtain the synchronization source information of the BM-SC by parsing the RTCP packet.

In a specific implementation process, a person of ordinary skill in the art of this application may select anyone of the foregoing three manners according to an actual requirement, to obtain the synchronization source information of the BM-SC. This is not specifically limited in this application.

Next, the GCS AS performs S102. In this embodiment of the present disclosure, the GCS AS provides the synchronization source information of the BM-SC or the synchronization source reference information of the BM-SC for the UE in the following two methods.

Method 11: The GCS AS sends SIP information to the UE by using a Session Initiation Protocol (SIP for short) procedure, where the SIP information includes the synchronization source information of the BM-SC or the synchronization source reference information of the BM-SC.

Specifically, when the GCS AS needs to initiate a session to the UE, the GCS AS initiates the SIP procedure to the UE. In the SIP procedure, the GCS AS sends, to the UE, the SIP information such as an acknowledgment response ACK message, BYE information that indicates session ending, or CANCEL information that indicates that an incomplete request is to be cancelled. To provide the synchronization source information of the BM-SC or the synchronization source reference information of the BM-SC for the UE, the GCS AS may add the synchronization source information of the BM-SC or the synchronization source reference information of the BM-SC to the SIP information, for example, to the ACK message or the CANCEL information. The GCS SA sends the SIP information that includes the synchronization source information of the BM-SC or the synchronization source reference information of the BM-SC to the UE in the SIP procedure, so that the GCS AS provides the synchronization source information of the BM-SC or the synchronization source reference information of the BM-SC for the UE.

The GCS AS provides the synchronization source information of the GCS AS for the UE still by sending an RTP packet to the UE in a unicast transmission manner. Packet header information of the RTP packet includes the synchronization source information of the GCS AS, and the UE can obtain the synchronization source information of the GCS AS by parsing the RTP packet.

Method 12: The GCS AS sends the RTP packet to the UE, where packet header information of the RTP packet includes the synchronization source information of the BM-SC or the synchronization source reference information of the BM-SC, and the packet header information further includes the synchronization source information of the GCS AS.

Specifically, the GCS AS may add the synchronization source information of the BM-SC or the synchronization source reference information of the BM-SC to packet header information of an RTP packet to be sent by the GCS AS. In a specific implementation process, the GCS AS may extend a packet header of the RTP packet by a new bit such as by two bits, to carry the synchronization source information of the BM-SC or the synchronization source reference information of the BM-SC. Alternatively, a CSRC identifier of the GCS AS in a packet header may be changed into the SSRC identifier of the BM-SC, and then a new bit is added to the packet header, so as to fill the RTP packet sequence number reference information and the timestamp reference information into the added bit. In this way, the packet header information of the RTP packet not only includes the synchronization source information of the GCS AS, but also includes the synchronization source information of the BM-SC or the synchronization source reference information of the BM-SC. In a specific implementation process, no specific limitation is set to a manner for adding the synchronization source information of the BM-SC or the synchronization source reference information of the BM-SC to, for example, the packet header information.

By using the technical solutions, a GCS AS provides both synchronization source information of the GCS AS and synchronization source information of a BM-SC for UE. Therefore, the UE can save both the two pieces of synchronization source information in a trust list of the UE, so as to continuously receive RTP packets.

Figure 4:
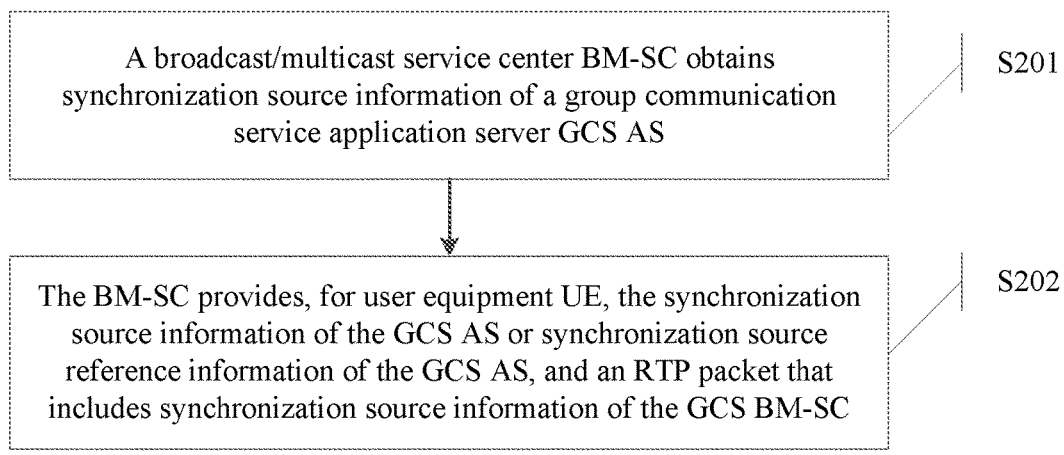
FIG. 4 is a flowchart of another RTP packet transmission method according to an embodiment of the present disclosure.
Figure 5:
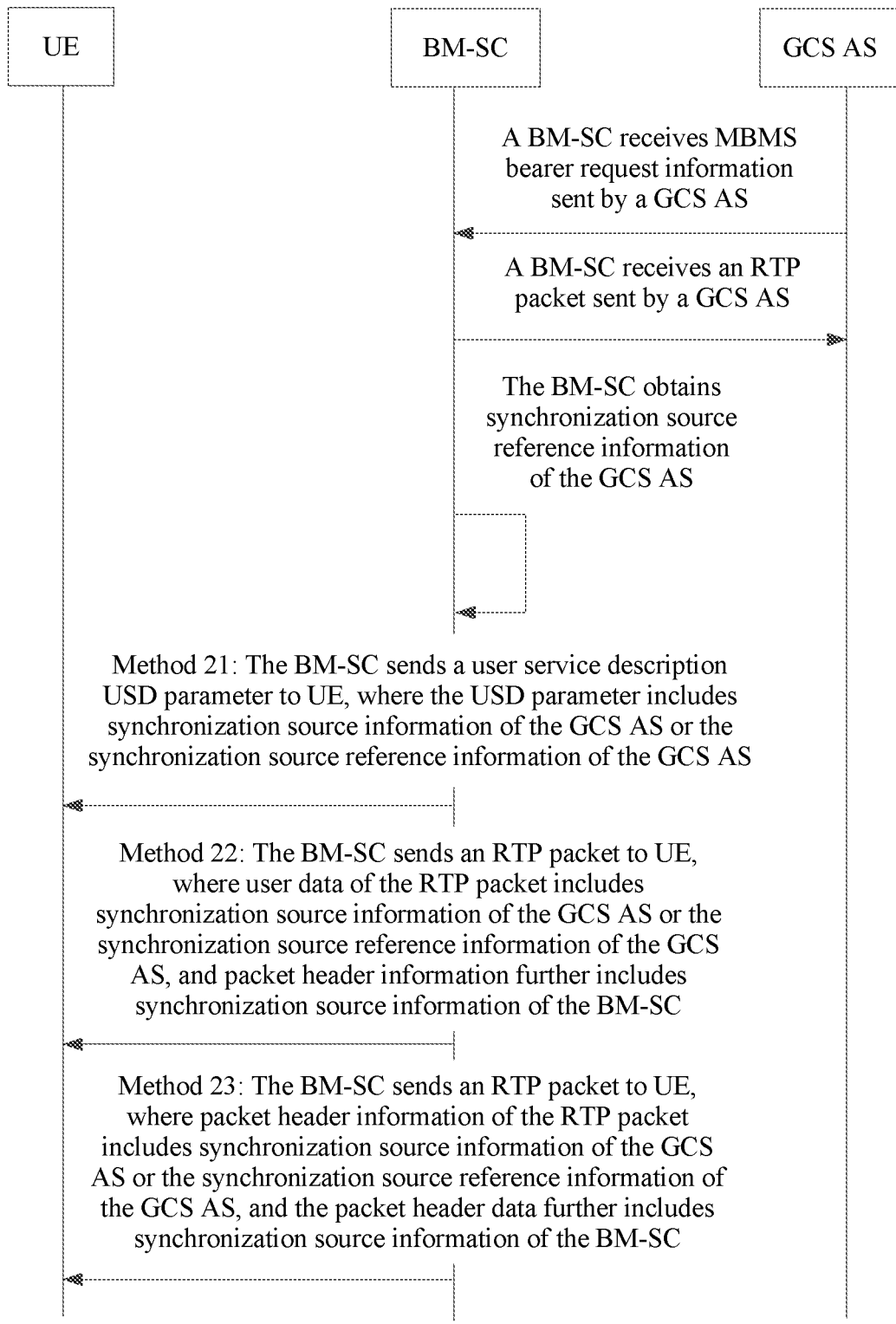
FIG. 5 is another schematic diagram of interaction among a GCS AS, a BM-SC, and UE according to an embodiment of the present disclosure.

A second aspect of this application describes an RTP packet transmission method from a BM-SC side. Referring to FIG. 4 and FIG. 5, the method includes the following steps:

S201. A broadcast/multicast service center BM-SC obtains synchronization source information of a group communication service application server GCS AS.

S202. The BM-SC provides, for user equipment UE, the synchronization source information of the GCS AS or synchronization source reference information of the GCS AS, and an RTP packet that includes synchronization source information of the BM-SC.

The BM-SC first obtains the synchronization source information of the GCS AS in S201, and provides the synchronization source information of the GCS AS for the UE in S202. In addition, the BM-SC further sends the RTP packet to the UE. The RTP packet includes the synchronization source information of the BM-SC. Therefore, the UE can obtain the synchronization source information of the BM-SC by parsing the RTP packet. Therefore, in this embodiment of the present disclosure, the BM-SC may provide the synchronization source information of the GCS AS and the synchronization source information of the BM-SC for the UE, so that the UE can save both the two pieces of synchronization source information in a trust list of the UE.

In this embodiment of the present disclosure, the synchronization source information of the BM-SC includes but is not limited to a synchronization data source SSRC identifier of the BM-SC, a sequence number SN10 of an RTP packet sent by the BM-SC, and a timestamp of the BM-SC. The synchronization source information of the GCS AS includes but is not limited to an SSRC identifier of the GCS AS, a sequence number SN20 of an RTP packet sent by the GCS AS, and a timestamp of the GCS AS.

In addition, similar to the method for providing the two pieces of synchronization source information by the GCS AS for the UE, in this embodiment of the present disclosure, the BM-SC may further provide the synchronization source reference information of the GCS AS for the UE. The synchronization source reference information of the GCS AS is information determined by the BM-SC according to the received synchronization source information of the GCS AS and the synchronization source information of the BM-SC.

When the BM-SC provides the synchronization source reference information of the GCS AS for the UE, that the BM-SC provides, for the user equipment UE, the synchronization source reference information of the GCS AS and the RTP packet that includes the synchronization source information of the BM-SC includes:

determining, by the BM-SC, RTP packet sequence number reference information and timestamp reference information according to the synchronization source information of the BM-SC and the synchronization source information of the GCS AS, where the RTP packet sequence number reference information is a difference between the sequence number SN10 of the RTP packet sent by the BM-SC and the sequence number SN20 of the RTP packet sent by the GCS AS, and the timestamp reference information is a difference between the timestamp of the BM-SC and the timestamp of the GCS AS; and obtaining, by the BM-SC, the synchronization source reference information that is of the GCS AS and that includes the SSRC identifier of the GCS AS, the RTP packet sequence number reference information, and the timestamp reference information.

In this embodiment of the present disclosure, methods for obtaining the RTP packet sequence number reference information and the timestamp reference information by the BM-SC are similar to the methods for obtaining the RTP packet sequence number reference information and the timestamp reference information by the GCS AS. Details are not described herein again.

Therefore, in S202, the BM-SC provides the synchronization source reference information of the GCS AS for the UE, so that the UE obtains the synchronization source information of the GCS AS according to both the synchronization source reference information of the GCS AS and the synchronization source information of the BM-SC that is obtained from the RTP packet. Finally, the UE saves both the two pieces of synchronization source information in the trust list of the UE.

Therefore, after an RTP packet transmission manner is switched from a unicast manner to a multicast manner, or is switched from a multicast manner to a unicast manner, two pieces of synchronization source information are saved in a trust list of UE. Therefore, regardless of whether a BM-SC or a GCS AS transmits an RTP packet after the switching, the UE can identify the RTP packet, so as to continuously receive RTP packets.

The following describes a method for obtaining the synchronization source reference information of the GCS AS by the BM-SC in S202. In this embodiment of the present disclosure, the method specifically includes:

receiving, by the BM-SC, MBMS bearer request information sent by the GCS AS, where the MBMS bearer request information includes the synchronization source information of the GCS AS, and obtaining the synchronization source information of the GCS AS from the MBMS bearer request information; or receiving, by the BM-SC, an RTP packet that is sent by the GCS AS and that includes the synchronization source information of the GCS AS, and obtaining the synchronization source information of the GCS AS from the RTP packet that includes the synchronization source information of the GCS AS.

Specifically, in order that the BM-SC obtains the synchronization source information of the GCS AS, the GCS AS may add the synchronization source information of the GCS AS to the MBMS bearer request information, and send the MBMS bearer request information to the BM-SC by using an MB2 interface. The BM-SC receives the MBMS bearer request information sent by the GCS AS. Because the MBMS bearer request information includes the synchronization source information of the GCS AS, the BM-SC can obtain the synchronization source information of the GCS AS by reading and parsing the MBMS bearer request information.

Alternatively, the GCS AS may fill the synchronization source information of the GCS AS into packet header information of a to-be-sent RTP packet in a prior-art multicast transmission manner, and sends the RTP packet to the BM-SC by using an MB2 interface. After receiving the RTP packet sent by the GCS AS, the BM-SC parses the RTP packet, and obtains the synchronization source information of the GCS AS from the packet header information.

In a specific implementation process, a person of ordinary skill in the art of this application may select, according to an actual requirement, a specific method of the foregoing two methods as the method for obtaining the synchronization source information of the GCS AS by the BM-SC. This is not specifically limited in this application.

After obtaining the synchronization source information of the GCS AS, the BM-SC may further obtain the synchronization source reference information of the GCS AS according to the foregoing method, and then provide the synchronization source reference information of the GCS AS for the UE in S202. Alternatively, the BM-SC may directly provide the obtained synchronization source information of the GCS AS for the UE. A person of ordinary skill in the art of this application may perform setting according to an actual requirement. This is not specifically limited in this application.

In this embodiment of the present disclosure, the BM-SC provides the synchronization source information of the GCS AS or the synchronization source reference information of the GCS AS for the UE in multiple methods. The multiple methods include but are not limited to the following several methods.

Method 21: The BM-SC sends a user service description USD parameter to the UE, where the USD parameter includes the synchronization source information of the GCS AS or the synchronization source reference information of the GCS AS.

Specifically, the user service description (USD) parameter is a set of parameters related to a user service. The USD parameter includes a Session Description Protocol (SDP) parameter, a service sending time, a service sending frequency, and the like. To add the synchronization source information of the GCS AS or the synchronization source reference information of the GCS AS to the USD parameter, the BM-SC may encapsulate the synchronization source information of the GCS AS or the synchronization source reference information of the GCS AS into the SDP parameter of the USD parameter, or may add the synchronization source information of the GCS AS or the synchronization source reference information of the GCS AS to the SDP parameter. Certainly, in a specific implementation process, a person of ordinary skill in the art may encapsulate the synchronization source information of the GCS AS or the synchronization source reference information of the GCS AS into another parameter of the USD parameter except the SDP parameter, for example, the service sending time or the service sending frequency. This is not specifically limited in this application.

Next, the BM-SC sends the USD parameter that includes the synchronization source information of the GCS AS or the synchronization source reference information of the GCS AS to the UE, so that the UE parses the USD parameter to obtain the synchronization source information of the GCS AS or the synchronization source reference information of the GCS AS.

In this embodiment of the present disclosure, regardless of whether the BM-SC encapsulates the synchronization source information of the GCS AS or the synchronization source reference information of the GCS AS into the SDP parameter or the another parameter of the USD parameter except the SDP parameter, the BM-SC may send the USD parameter that includes the synchronization source information of the GCS AS or the synchronization source reference information of the GCS AS to the UE in the following four manners.

(1) The BM-SC broadcasts the USD parameter to the UE.

The BM-SC delivers the USD parameter to the UE by using a broadcast transmission process. Specifically, the BM-SC, an MBMS GW, and an eNB are sequentially used, and then the eNB delivers the USD parameter to the UE by means of broadcast. In this embodiment of the present disclosure, a process in which the BM-SC sends the RTP packet to the UE and a process in which the BM-SC sends the USD parameter by means of broadcast are independent from each other.

(2) The BM-SC sends the USD parameter to the UE in a unicast transmission manner.

The BM-SC delivers the USD parameter to the UE in the unicast transmission manner. The USD parameter is sent to the UE by sequentially using a P-GW, an S-GW, and an eNB. In this embodiment of the present disclosure, a process in which the BM-SC sends the RTP packet to the UE and a process in which the BM-SC sends the USD parameter by means of unicast are independent from each other.

(3) The BM-SC sends the USD parameter to the GCS AS, so that the GCS AS sends the USD parameter to the UE in a unicast transmission manner.

Alternatively, the BM-SC may send the USD parameter that includes the synchronization source information of the GCS AS or the synchronization source reference information of the GCS AS to the GCS AS by using an MB2 interface. After receiving the USD parameter, the GCS AS sends the USD parameter to the UE by using a unicast transmission process. That is, the USD parameter is sent to the UE by sequentially using the GCS AS, a P-GW, an S-GW, and an eNB. In this embodiment of the present disclosure, a process in which the BM-SC sends the RTP packet to the UE and a process in which the BM-SC sends the USD parameter to the GCS AS are independent from each other.

(4) The BM-SC sends the USD parameter to the GCS AS, so that the GCS AS sends the USD parameter to the UE by using a SIP procedure.

Alternatively, the BM-SC may send the USD parameter that includes the synchronization source information of the GCS AS or the synchronization source reference information of the GCS AS to the GCS AS by using an MB2 interface. The GCS AS directly sends the USD parameter to the UE by using the SIP procedure. When the GCS AS sends the USD parameter to the UE by using the SIP procedure, the GCS AS may directly send the USD parameter to the UE without forwarding the USD parameter, that is, the USD parameter is directly sent from the GCS AS to the UE. In this embodiment of the present disclosure, a process in which the BM-SC sends the RTP packet to the UE and a process in which the BM-SC sends the USD parameter to the GCS AS are independent from each other.

In a specific implementation process of Method 21, scheduling of the GCS AS may change, for example, timestamp adjustment or rearrangement of RTP packet sequence numbers. Therefore, the synchronization source information of the GCS AS is updated. In this way, after the synchronization source information of the GCS AS is updated, in order that the UE still can identify an RTP packet from the GCS AS, the BM-SC needs to re-obtain a USD parameter according to updated synchronization source information of the GCS AS or updated synchronization source reference information of the GCS AS, and send the USD parameter to the UE.

In this embodiment of the present disclosure, the BM-SC may re-obtain the USD parameter when the synchronization source information of the GCS AS is updated, and send the USD parameter to the UE. Alternatively, the BM-SC may periodically re-obtain a USD parameter, for example, every ten minutes, and send the USD parameter to the UE. A person of ordinary skill in the art of this application may make selection according to an actual requirement. This is not specifically limited in this application.

Method 22: The BM-SC sends the RTP packet to the UE, where user data of the RTP packet includes the synchronization source information of the GCS AS or the synchronization source reference information of the GCS AS, and packet header information of the RTP packet further includes the synchronization source information of the BM-SC.

In a multicast path, after receiving an RTP packet sent by the GCS AS, the BM-SC changes packet header information of the RTP packet according to the synchronization source information of the BM-SC. Synchronization source information included in changed packet header information is changed into the synchronization source information of the BM-SC. Because a changed RTP packet no longer includes the synchronization source information of the GCS AS, the BM-SC needs to add the synchronization source information of the GCS AS or the synchronization source reference information of the GCS AS to user data of the RTP packet. In this way, the packet header information of the RTP packet includes the synchronization source information of the BM-SC, and the user data includes the synchronization source information of the GCS AS or the synchronization source reference information of the GCS AS. Therefore, the UE may obtain the two pieces of synchronization source information by parsing the RTP packet sent by the BM-SC.

Method 23: The BM-SC sends the RTP packet to the UE, where packet header information of the RTP packet includes the synchronization source information of the GCS AS or the synchronization source reference information of the GCS AS, and the packet header information further includes the synchronization source information of the BM-SC.

Specifically, the BM-SC may add the synchronization source information of the GCS AS or the synchronization source reference information of the GCS AS to the user data of the RTP packet sent by the BM-SC, or may add the synchronization source information of the GCS AS or the synchronization source reference information of the GCS AS to the packet header information of the RTP packet. For example, two bits are added to a packet header of the RTP packet to carry the synchronization source information of the GCS AS or the synchronization source reference information of the GCS AS. Alternatively, a CSRC identifier of the BM-SC in a packet header may be changed into the SSRC identifier of the GCS AS, and then a new bit is added to the packet header, so as to fill the RTP packet sequence number reference information and the timestamp reference information into the added bit. In this way, the packet header information of the RTP packet not only includes the synchronization source information of the BM-SC, but also includes the synchronization source information of the GCS AS or the synchronization source reference information of the GCS AS. Therefore, the UE may obtain the two pieces of synchronization source information by parsing the RTP packet sent by the BM-SC.

In a specific implementation process, a person of ordinary skill in the art of this application may select Method 21, Method 22, or Method 23 according to an actual requirement. This is not specifically limited in this application.

Figure 6:
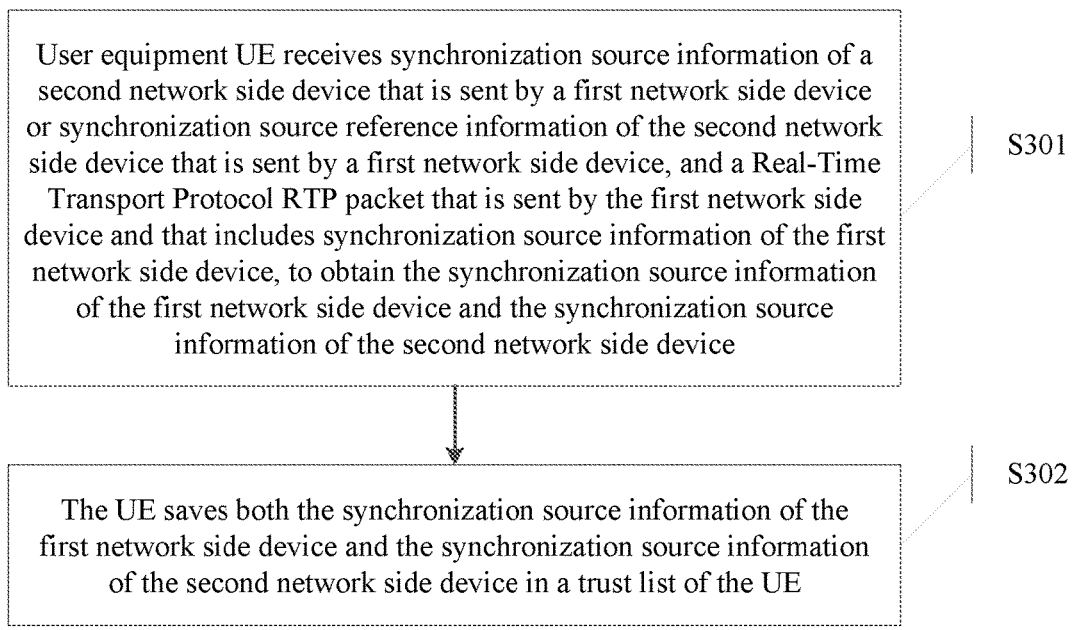
FIG. 6 is a flowchart of a synchronization source information obtaining method according to an embodiment of the present disclosure.

A third aspect of the embodiments of this application describes a synchronization source information obtaining method in an embodiment from a UE side. Referring to FIG. 6, the method includes the following steps:

S301. User equipment UE receives synchronization source information of a second network side device that is sent by a first network side device or synchronization source reference information of a second network side device that is sent by a first network side device, and a Real-Time Transport Protocol RTP packet that is sent by the first network side device and that includes synchronization source information of the first network side device, to obtain the synchronization source information of the first network side device and the synchronization source information of the second network side device.

S302. The UE saves both the synchronization source information of the first network side device and the synchronization source information of the second network side device in a trust list of the UE.

In this embodiment of the present disclosure, the first network side device is a GCS AS, and the second network side device is specifically a BM-SC. Alternatively, the first network side device is specifically a BM-SC, and the second network side device is specifically a GCS AS. This is not limited in this application.

Specifically, the UE receives the RTP packet sent by the first network side device. The UE obtains the synchronization source information of the first network side device from packet header information of the RTP packet.

Next, in this embodiment of the present disclosure, the first network side device may directly provide the synchronization source information of the second network side device for the UE. Alternatively, the first network side device may indirectly provide the synchronization source information of the second network side device, that is, provide the synchronization source reference information of the second network side device. When receiving the synchronization source information of the second network side device, the UE may directly save the received synchronization source information of the first network side device and the received synchronization source information of the second network side device in the trust list of the UE in S302.

In this embodiment of the present disclosure, the synchronization source information of the first network side device includes but is not limited to an SSRC identifier of the first network side device, a sequence number SN10 of an RTP packet sent by the first network side device, and a timestamp of the first network side device. The synchronization source information of the second network side device includes but is not limited to an SSRC identifier of the second network side device, a sequence number SN20 of an RTP packet sent by the second network side device, and a timestamp of the second network side device.

However, when receiving the synchronization source reference information of the second network side device that is provided by the first network side device, the UE needs to determine the synchronization source information of the second network side device with reference to the synchronization source information of the first network side device. The synchronization source reference information of the second network side device is information determined by the first network side device according to the synchronization source information of the first network side device and the synchronization source reference information of the second network side device.

Specifically, in this embodiment of the present disclosure, the synchronization source reference information of the second network side device includes the SSRC identifier of the second network side device, RTP packet sequence number reference information, and timestamp reference information.

The RTP packet sequence number reference information is a difference between the sequence number SN10 of the RTP packet sent by the first network side device and the sequence number SN20 of the RTP packet sent by the second network side device. The timestamp reference information is a difference between the timestamp of the first network side device and the timestamp of the second network side device.

Therefore, that the UE determines the synchronization source information of the second network side device according to the synchronization source information of the first network side device and the synchronization source reference information of the second network side device includes:

obtaining, by the UE, the SSRC identifier of the second network side device from the synchronization source reference information of the second network side device;

determining, by the UE according to the RTP packet sequence number reference information in the synchronization source reference information of the second network side device, and the sequence number SN10 of the RTP packet sent by the first network side device, the sequence number SN20 of the RTP packet sent by the second network side device; and determining, by the UE, the timestamp of the second network side device according to the timestamp reference information in the synchronization source reference information of the second network side device, and the timestamp of the first network side device.

Because the synchronization source reference information of the second network side device includes the SSRC identifier of the second network side device, the SSRC identifier of the second network side device can be directly obtained according to the synchronization source reference information of the second network side device.

Further, for the sequence number SN20 of the RTP packet sent by the second network side device (or the timestamp of the second network side device), the first network side device and the UE may pre-stipulate that the RTP packet sequence number reference information (or the timestamp reference information) is specifically a difference obtained by subtracting the SN20 (or the timestamp of the second network side) from the SN10 (or the timestamp of the first network side), or a difference obtained by subtracting the SN10 (or the timestamp of the first network side) from the SN20 (or the timestamp of the second network side). After obtaining the synchronization source information of the first network side device and the synchronization source reference information of the second network side device, the UE obtains the SN20 (or the timestamp of the second network side) by means of calculation according to the pre-stipulation.

Alternatively, the first network side device may notify the UE of a status of the RTP packet sequence number reference information (or the timestamp reference information) by using the synchronization source reference information of the second network side device. For example, a flag bit is added to the synchronization source reference information of the second network side device. When the flag bit is 0, it indicates that the RTP packet sequence number reference information (or the timestamp reference information) is specifically a difference obtained by subtracting the SN20 (or the timestamp of the second network side) from the SN10 (or the timestamp of the first network side). When the flag bit is 1, it indicates that the RTP packet sequence number reference information (or the timestamp reference information) is specifically a difference obtained by subtracting the SN10 (or the timestamp of the first network side) from the SN20 (or the timestamp of the second network side). Therefore, after obtaining the synchronization source information of the first network side device and the synchronization source reference information of the second network side device, the UE obtains the SN20 (or the timestamp of the second network side) by means of calculation according to the pre-stipulation. A person of ordinary skill in the art of this application may make selection according to an actual requirement. This is not specifically limited in this application.

For example, the SN10 in the synchronization source information of the first network side device is 5, the timestamp t1 of the first network side device is 15, the RTP packet sequence number reference information in the synchronization source reference information of the second network side device is −2, and the timestamp reference information is −5. Assuming that the first network side device and the UE pre-stipulate that the RTP packet sequence number reference information is specifically SN20−SN10, and the timestamp reference information is specifically a difference obtained by subtracting the timestamp t1 of the first network side device from the timestamp t2 of the second network side device, it may be learned, according to the SN10 of 5 and the RTP packet sequence number reference information of −2, that SN20=3, and it may be learned, according to the timestamp t1 of the first network side device: 15 and the timestamp reference information of −5, that the timestamp t2 of the second network side device is 10.

Therefore, the UE obtains the synchronization source information of the second network side device, including the SSRC identifier of the second network side device, the SN20 of 3, and the timestamp t2 of the second network side device: 10.

In this embodiment of the present disclosure, a method for obtaining the synchronization source information of the first network side device by the UE is as follows: The UE parses the RTP packet sent by the first network side device, and obtains the synchronization source information of the first network side device from the packet header information. The UE obtains the synchronization source information of the second network side device or the synchronization source reference information of the second network side device in the following several methods.

Method 1:

The UE receives SIP information sent by the first network side device to the UE by using a Session Initiation Protocol SIP procedure, where the SIP information includes the synchronization source information of the second network side device or the synchronization source reference information of the second network side device, the first network side device is the GCS AS, and the second network side device is the BM-SC.

When the first network side device is the GCS AS, on one hand, the UE may obtain the synchronization source information of the GCS AS from the RTP packet sent by the GCS AS; on the other hand, the UE accepts the SIP procedure initiated by the GCS AS, and receives the SIP information sent by the GCS AS in the SIP procedure, for example, ACK information and BYE information.

Because the GCS AS adds the synchronization source information of the BM-SC or the synchronization source reference information of the BM-SC to the SIP information, the UE can obtain the synchronization source information of the BM-SC or the synchronization source reference information of the BM-SC by parsing the SIP information.

Method 2:

The UE receives the RTP packet sent by the first network side device, where packet header information of the RTP packet includes the synchronization source information of the second network side device or the synchronization source reference information of the second network side device, the packet header information further includes the synchronization source information of the first network side device, the first network side device is the GCS AS, and the second network side device is the BM-SC.

Specifically, the BM-SC first receives the RTP packet sent by the GCS AS, and then obtains the synchronization source information of the GCS AS by means of parsing. Optionally, the BM-SC obtains the synchronization source reference information of the BM-SC according to the synchronization source information of the BM-SC and the synchronization source information of the GCS AS. Then, on one hand, the BM-SC changes the packet header information of the RTP packet according to the synchronization source information of the BM-SC. On the other hand, the BM-SC further adds the synchronization source information of the BM-SC or the synchronization source reference information of the BM-SC to the packet header information of the RTP packet. However, the synchronization source information of the BM-SC or the synchronization source reference information of the BM-SC is placed at a different location. The location for placing the synchronization source information of the BM-SC or the synchronization source reference information of the BM-SC is a location that cannot represent the synchronization source information of the GCS AS that sends the RTP packet. Finally, a changed RTP packet is returned to the GCS AS by using an MB2 interface.

The GCS AS receives the returned RTP packet, and changes the synchronization source information in a packet header of the RTP packet into the synchronization source information of the GCS AS. However, the GCS AS does not change the location, in the packet header information, that is for placing the synchronization source reference information of the BM-SC or the synchronization source information of the BM-SC and that does not represent the synchronization source information of the GCS AS. Therefore, after being changed by the GCS AS, the packet header of the RTP packet includes the synchronization source information of the GCS AS, and the synchronization source information of the BM-SC or the synchronization source reference information of the BM-SC.

On the UE side, the UE finally receives the RTP packet sent by the GCS AS by means of unicast. The UE parses the RTP packet, and obtains, from the packet header data, the synchronization source information of the GCS AS, and the synchronization source information of the BM-SC or the synchronization source reference information of the BM-SC.

Method 3:

The UE receives a user service description USD parameter sent by the first network side device, where the USD parameter includes the synchronization source information of the second network side device or the synchronization source reference information of the second network side device, the first network side device is the BM-SC, and the second network side device is the GCS AS.

Specifically, when the first network side device is the BM-SC, the UE may obtain, by means of parsing, the synchronization source information of the BM-SC from the RTP packet sent by the BM-SC in a multicast transmission manner. For the synchronization source information of the GCS AS or the synchronization source reference information of the GCS AS, the UE parses the USD parameter directly sent by the BM-SC in a unicast manner or a broadcast manner, and obtains the synchronization source information of the GCS AS or the synchronization source reference information of the GCS AS from the parsed USD parameter. Certainly, the BM-SC may send the USD parameter to the GCS AS, and the GCS AS sends the USD parameter to the UE. This is not specifically limited in this application.

If the GCS AS sends the USD parameter, in this embodiment of the present disclosure, the UE may receive, by using an eNB, the USD parameter sent by the GCS AS in a unicast manner, or may receive, in the SIP procedure of the GCS AS, the USD parameter directly sent by the GCS AS. A person of ordinary skill in the art of this application may perform setting according to an actual requirement. This is not specifically limited in this application. A specific sending manner is described above, and details are not described herein again.

Further, the BM-SC may encapsulate the synchronization source information of the GCS AS or the synchronization source reference information of the GCS AS into an SDP parameter of the USD parameter, or into another parameter of the USD parameter except an SDP parameter. Therefore, after parsing the USD parameter, the UE may obtain the synchronization source information of the GCS AS or the synchronization source reference information of the GCS AS from the SDP parameter or from the another parameter of the USD parameter except the SDP parameter.

Method 4:

The UE receives the RTP packet sent by the first network side device, where user data or packet header information of the RTP packet includes the synchronization source information of the second network side device or the synchronization source reference information of the second network side device, the packet header information further includes the synchronization source information of the first network side device, the first network side device is the BM-SC, and the second network side device is the GCS AS.

Specifically, when the BM-SC sends both the synchronization source information of the BM-SC and the synchronization source information of the GCS AS, or both the synchronization source information of the BM-SC and the synchronization source reference information of the GCS AS to the UE by using a same RTP packet, the UE parses the RTP packet after receiving the RTP packet.

When the BM-SC adds the synchronization source information of the GCS AS or the synchronization source reference information of the GCS AS to the user data of the RTP packet, the UE obtains the synchronization source reference information of the GCS AS from the user data of the parsed RTP packet. In addition, the UE obtains the synchronization source information of the BM-SC from the packet header information of the RTP packet.

Finally, the UE saves both the synchronization source information of the first network side device and the synchronization source information of the second network side device in the trust list of the UE in S302.

After a transmission manner is switched from a unicast manner to a multicast manner, because a trust list saves synchronization source information of a BM-SC, UE may identify an RTP packet sent by the BM-SC. Similarly, after the transmission manner is switched from the multicast manner to the unicast manner, because the trust list saves synchronization source information of a GCS AS, the UE may identify an RTP packet sent by the GCS AS.

Therefore, in this embodiment of the present disclosure, after the transmission manner is switched between the multicast manner and the unicast manner, the UE still can continuously receive RIP packets, so as to maintain reception continuity.

Figure 7:
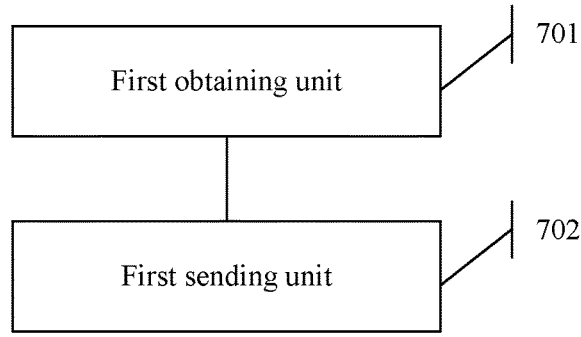
FIG. 7 is a schematic structural diagram of an RTP packet transmission apparatus according to an embodiment of the present disclosure.

A fourth aspect of this application provides a Real-Time Transport Protocol RTP packet transmission apparatus. As shown in FIG. 7, the apparatus includes:

a first obtaining unit 701, configured to obtain synchronization source information of a broadcast/multicast service center BM-SC; and a first sending unit 702, configured to provide, for user equipment UE, the synchronization source information of the BM-SC or synchronization source reference information of the BM-SC, and an RTP packet that includes synchronization source information of a group communication service application server GCS AS, so that the UE obtains and saves the synchronization source information of the BM-SC and the synchronization source information of the GCS AS in a trust list of the UE.

The synchronization source reference information of the BM-SC is information determined according to the synchronization source information of the BM-SC and the synchronization source information of the GCS AS.

Optionally, the first sending unit 702 is configured to:

provide, for the UE, the synchronization source reference information of the BM-SC and the RTP packet that includes the synchronization source information of the GCS AS, so that the UE obtains the synchronization source information of the BM-SC according to the synchronization source information of the GCS AS and the synchronization source reference information of the BM-SC, and saves the synchronization source information of the BM-SC and the synchronization source information of the GCS AS in the trust list of the UE.

In this embodiment of the present disclosure, the synchronization source information of the BM-SC includes a synchronization data source SSRC identifier of the BM-SC, a sequence number SN10 of an RTP packet sent by the BM-SC, and a timestamp of the BM-SC.

The synchronization source information of the GCS AS includes an SSRC identifier of the GCS AS, a sequence number SN20 of an RTP packet sent by the GCS AS, and a timestamp of the GCS AS.

Further, the first sending unit 702 is configured to:

determine RTP packet sequence number reference information and timestamp reference information according to the synchronization source information of the BM-SC and the synchronization source information of the GCS AS, where the RTP packet sequence number reference information is a difference between the sequence number SN10 of the RTP packet sent by the BM-SC and the sequence number SN20 of the RTP packet sent by the GCS AS, and the timestamp reference information is a difference between the timestamp of the BM-SC and the timestamp of the GCS AS; and obtain the synchronization source reference information that is of the BM-SC and that includes the SSRC identifier of the BM-SC, the RTP packet sequence number reference information, and the timestamp reference information.

Optionally, the first obtaining unit 701 is configured to:

receive active Multimedia Broadcast Multicast Service MBMS status indication information sent by the BM-SC, where the active MBMS status indication information includes the synchronization source information of the BM-SC, and obtain the synchronization source information of the BM-SC from the active MBMS status indication information; or receive the synchronization source information of the BM-SC that is sent by the BM-SC; or receive an RTP Control Protocol RTCP packet that is sent by the BM-SC and that includes the synchronization source information of the BM-SC, and obtain the synchronization source information of the BM-SC from the RTCP packet.

In this embodiment of the present disclosure, the synchronization source information of the BM-SC or the synchronization source reference information of the BM-SC is sent in multiple manners. Therefore, the first sending unit 702 is configured to:

send SIP information to the UE by using a Session Initiation Protocol SIP procedure, where the SIP information includes the synchronization source information of the BM-SC or the synchronization source reference information of the BM-SC.

Alternatively, the first sending unit 702 is configured to:

send the RTP packet to the UE, where packet header information of the RTP packet includes the synchronization source information of the BM-SC or the synchronization source reference information of the BM-SC, and the packet header information further includes the synchronization source information of the GCS AS.

Figure 8:
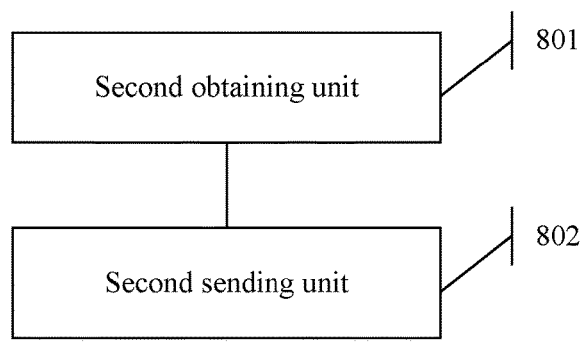
FIG. 8 is a schematic structural diagram of another RTP packet transmission apparatus according to an embodiment of the present disclosure.

A fifth aspect of this application provides a Real-Time Transport Protocol RTP packet transmission apparatus. As shown in FIG. 8, the apparatus includes:

a second obtaining unit 801, configured to obtain synchronization source information of a group communication service application server GCS AS; and a second sending unit 802, configured to provide, for user equipment UE, the synchronization source information of the GCS AS or synchronization source reference information of the GCS AS, and an RTP packet that includes synchronization source information of a broadcast/multicast service center BM-SC, so that the UE obtains and saves the synchronization source information of the BM-SC and the synchronization source information of the GCS AS in a trust list of the UE.

The synchronization source reference information of the GCS AS is information determined according to the synchronization source information of the GCS AS and the synchronization source information of the BM-SC.

Optionally, the second sending unit 802 is configured to:

provide, for the UE, the synchronization source reference information of the GCS AS and the RTP packet that includes the synchronization source information of the BM-SC, so that the UE obtains the synchronization source information of the GCS AS according to the synchronization source information of the BM-SC and the synchronization source reference information of the GCS AS, and saves the synchronization source information of the BM-SC and the synchronization source information of the GCS AS in the trust list of the UE.

In this embodiment of the present disclosure, the synchronization source information of the BM-SC includes a synchronization data source SSRC identifier of the BM-SC, a sequence number SN10 of an RTP packet sent by the BM-SC, and a timestamp of the BM-SC.

The synchronization source information of the GCS AS includes an SSRC identifier of the GCS AS, a sequence number SN20 of an RTP packet sent by the GCS AS, and a timestamp of the GCS AS.

Further, the second sending unit 802 is configured to:

determine RTP packet sequence number reference information and timestamp reference information according to the synchronization source information of the BM-SC and the synchronization source information of the GCS AS, where the RTP packet sequence number reference information is a difference between the sequence number SN10 of the RTP packet sent by the BM-SC and the sequence number SN20 of the RTP packet sent by the GCS AS, and the timestamp reference information is a difference between the timestamp of the BM-SC and the timestamp of the GCS AS; and obtain the synchronization source reference information that is of the GCS AS and that includes the SSRC identifier of the GCS AS, the RTP packet sequence number reference information, and the timestamp reference information.

Specifically, the second obtaining unit 801 is configured to:

receive MBMS bearer request information sent by the GCS AS, where the MBMS bearer request information includes the synchronization source information of the GCS AS, and obtain the synchronization source information of the GCS AS from the MBMS bearer request information; or receive an RTP packet that is sent by the GCS AS and that includes the synchronization source information of the GCS AS, and obtain the synchronization source information of the GCS AS from the RTP packet that includes the synchronization source information of the GCS AS.

In this embodiment of the present disclosure, the second sending unit 802 is configured to:

send a user service description USD parameter to the UE, where the USD parameter includes the synchronization source information of the GCS AS or the synchronization source reference information of the GCS AS.

Alternatively, the second sending unit 802 is configured to:

send the RTP packet to the UE, where user data or packet header information of the RTP packet includes the synchronization source information of the GCS AS or the synchronization source reference information of the GCS AS, and the packet header information further includes the synchronization source information of the BM-SC.

Specifically, the BM-SC sends the USD parameter to the UE in multiple manners. Therefore, the second sending unit 802 is specifically configured to:

send the USD parameter to the GCS AS, so that the GCS AS sends the USD parameter to the UE in a unicast transmission manner; or send the USD parameter to the GCS AS, so that the GCS AS sends the USD parameter to the UE by using a SIP procedure.

Figure 9:
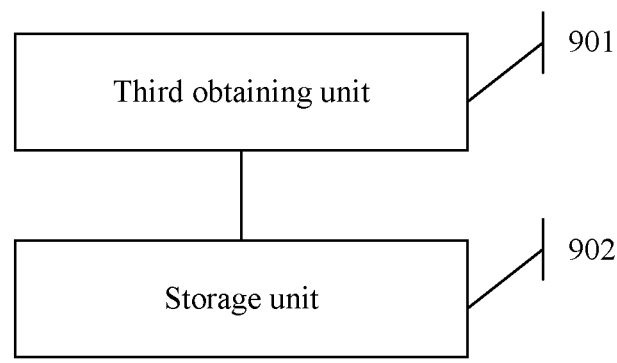
FIG. 9 is a schematic structural diagram of a synchronization source information obtaining apparatus according to an embodiment of the present disclosure.

A sixth aspect of this application provides a synchronization source information obtaining apparatus. As shown in FIG. 9, the apparatus includes:

a third obtaining unit 901, configured to receive synchronization source information of a second network side device that is sent by a first network side device or synchronization source reference information of a second network side device that is sent by a first network side device, and a Real-Time Transport Protocol RTP packet that is sent by the first network side device and that includes synchronization source information of the first network side device, to obtain the synchronization source information of the first network side device and the synchronization source information of the second network side device; and a storage unit 902, configured to save both the synchronization source information of the first network side device and the synchronization source information of the second network side device in a trust list of the UE.

The synchronization source reference information of the second network side device is information determined according to the synchronization source information of the first network side device and the synchronization source information of the second network side device. The first network side device is a broadcast/multicast service center BM-SC, and the second network side device is a group communication service application server GCS AS; or the first network side device is a GCS AS, and the second network side device is a BM-SC.

Optionally, the third obtaining unit 901 is configured to:

receive the RTP packet that includes the synchronization source information of the first network side device, to obtain the synchronization source information of the first network side device and the synchronization source reference information of the second network side device; and determine the synchronization source information of the second network side device according to the synchronization source information of the first network side device and the synchronization source reference information of the second network side device.

In this embodiment of the present disclosure, the synchronization source information of the first network side device includes an SSRC identifier of the first network side device, a sequence number SN10 of an RTP packet sent by the first network side device, and a timestamp of the first network side device.

The synchronization source information of the second network side device includes an SSRC identifier of the second network side device, a sequence number SN20 of an RTP packet sent by the second network side device, and a timestamp of the second network side device.

The synchronization source reference information of the second network side device includes the SSRC identifier of the second network side device, RTP packet sequence number reference information, and timestamp reference information, where the RTP packet sequence number reference information is a difference between the sequence number SN10 of the RTP packet sent by the first network side device and the sequence number SN20 of the RTP packet sent by the second network side device, and the timestamp reference information is a difference between the timestamp of the first network side device and the timestamp of the second network side device.

Further, the third obtaining unit 901 is configured to:

obtain the SSRC identifier of the second network side device from the synchronization source reference information of the second network side device;

determine, according to the RTP packet sequence number reference information in the synchronization source reference information of the second network side device, and the sequence number SN10 of the RTP packet sent by the first network side device, the sequence number SN20 of the RTP packet sent by the second network side device; and determine the timestamp of the second network side device according to the timestamp reference information in the synchronization source reference information of the second network side device, and the timestamp of the first network side device.

Specifically, the third obtaining unit 901 is configured to:

receive SIP information sent by the first network side device to the UE by using a Session Initiation Protocol SIP procedure, where the SIP information includes the synchronization source information of the second network side device or the synchronization source reference information of the second network side device, the first network side device is the GCS AS, and the second network side device is the BM-SC; or receive the RTP packet sent by the first network side device, where packet header information of the RTP packet includes the synchronization source information of the second network side device or the synchronization source reference information of the second network side device, the packet header information further includes the synchronization source information of the first network side device, the first network side device is the GCS AS, and the second network side device is the BM-SC; or receive a user service description USD parameter sent by the first network side device, where the USD parameter includes the synchronization source information of the second network side device or the synchronization source reference information of the second network side device, the first network side device is the BM-SC, and the second network side device is the GCS AS; or receive the RTP packet sent by the first network side device, where user data or packet header information of the RIP packet includes the synchronization source information of the second network side device or the synchronization source reference information of the second network side device, the packet header information further includes the synchronization source information of the first network side device, the first network side device is the BM-SC, and the second network side device is the GCS AS.

Figure 10:
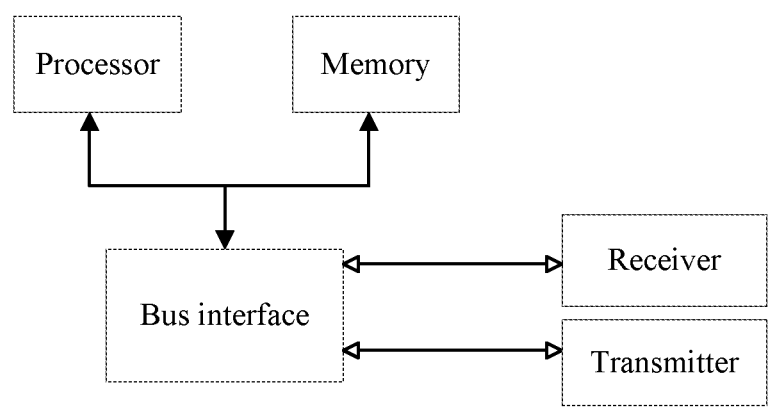
FIG. 10 is a schematic structural diagram of a GCS AS, a BM-SC, or UE according to an embodiment of the present disclosure.

FIG. 10 shows a possible schematic structural diagram of a GCS AS, a possible schematic structural diagram of a BM-SC, or a possible schematic structural diagram of UE according to an embodiment of the present disclosure.

As shown in the structure in FIG. 10, each of the GCS AS, the BM-SC, and the UE in this embodiment of the present disclosure at least includes a receiver, a transmitter, a processor, a memory, a bus interface, and a bus. However, for specific devices, functions of components are not exactly the same.

The following specifically describes functions of the components: the receiver, the transmitter, the processor, the memory, the bus interface, and the bus when the structure shown in FIG. 10 is specifically a different device.

1. When the device shown in FIG. 10 is a GCS AS, the receiver is configured to obtain synchronization source information of a broadcast/multicast service center BM-SC; and the transmitter is configured to provide, for user equipment UE, the synchronization source information of the BM-SC or synchronization source reference information of the BM-SC, and an RTP packet that includes synchronization source information of the GCS AS, so that the UE obtains and saves the synchronization source information of the BM-SC and the synchronization source information of the GCS AS in a trust list of the UE.

The synchronization source reference information of the BM-SC is information determined according to the synchronization source information of the BM-SC and the synchronization source information of the GCS AS.

Optionally, the transmitter is configured to:

provide, for the UE, the synchronization source reference information of the BM-SC and the RTP packet that includes the synchronization source information of the GCS AS, so that the UE obtains the synchronization source information of the BM-SC according to the synchronization source information of the GCS AS and the synchronization source reference information of the BM-SC, and saves the synchronization source information of the BM-SC and the synchronization source information of the GCS AS in the trust list of the UE.

When the structure shown in FIG. 10 is the GCS AS, the synchronization source information of the BM-SC includes a synchronization data source identifier SSRC identifier of the BM-SC, a sequence number SN10 of an RTP packet sent by the BM-SC, and a timestamp of the BM-SC; and the synchronization source information of the GCS AS includes an SSRC identifier of the GCS AS, a sequence number SN20 of an RTP packet sent by the GCS AS, and a timestamp of the GCS AS.

The processor is configured to:

determine RTP packet sequence number reference information and timestamp reference information according to the synchronization source information of the BM-SC and the synchronization source information of the GCS AS, where the RTP packet sequence number reference information is a difference between the sequence number SN10 of the RTP packet sent by the BM-SC and the sequence number SN20 of the RTP packet sent by the GCS AS, and the timestamp reference information is a difference between the timestamp of the BM-SC and the timestamp of the GCS AS; and obtain the synchronization source reference information that is of the BM-SC and that includes the SSRC identifier of the BM-SC, the RTP packet sequence number reference information, and the timestamp reference information.

Optionally, the receiver is configured to receive active Multimedia Broadcast Multicast Service MBMS status indication information sent by the BM-SC, where the active MBMS status indication information includes the synchronization source information of the BM-SC, and the processor is configured to obtain the synchronization source information of the BM-SC from the active MBMS status indication information; or the receiver is configured to receive the synchronization source information of the BM-SC that is sent by the BM-SC; or the receiver is configured to receive an RTP Control Protocol RTCP packet that is sent by the BM-SC and that includes the synchronization source information of the BM-SC, and the processor is configured to obtain the synchronization source information of the BM-SC from the RTCP packet.

Optionally, the transmitter is configured to:

send SIP information to the UE by using a Session Initiation Protocol SIP procedure, where the SIP information includes the synchronization source information of the BM-SC or the synchronization source reference information of the BM-SC.

Optionally, the transmitter is configured to:

send the RTP packet to the UE, where packet header information of the RTP packet includes the synchronization source information of the BM-SC or the synchronization source reference information of the BM-SC, and the packet header information further includes the synchronization source information of the GCS AS.

2. When the device shown in FIG. 10 is a BM-SC, the receiver is configured to obtain synchronization source information of a group communication service application server GCS AS; and the transmitter is configured to provide, for user equipment UE, the synchronization source information of the GCS AS or synchronization source reference information of the GCS AS, and an RTP packet that includes synchronization source information of the BM-SC, so that the UE obtains and saves the synchronization source information of the BM-SC and the synchronization source information of the GCS AS in a trust list of the UE.

The synchronization source reference information of the GCS AS is information determined according to the synchronization source information of the GCS AS and the synchronization source information of the BM-SC.

Optionally, the transmitter is configured to:

provide, for the UE, the synchronization source reference information of the GCS AS and the RTP packet that includes the synchronization source information of the BM-SC, so that the UE obtains the synchronization source information of the GCS AS according to the synchronization source information of the BM-SC and the synchronization source reference information of the GCS AS, and saves the synchronization source information of the BM-SC and the synchronization source information of the GCS AS in the trust list of the UE.

Specifically, the synchronization source information of the BM-SC includes a synchronization data source SSRC identifier of the BM-SC, a sequence number SN10 of an RTP packet sent by the BM-SC, and a timestamp of the BM-SC.

The synchronization source information of the GCS AS includes an SSRC identifier of the GCS AS, a sequence number SN20 of an RTP packet sent by the GCS AS, and a timestamp of the GCS AS.

Further, the processor of the BM-SC is configured to:

determine RTP packet sequence number reference information and timestamp reference information according to the synchronization source information of the BM-SC and the synchronization source information of the GCS AS, where the RTP packet sequence number reference information is a difference between the sequence number SN10 of the RTP packet sent by the BM-SC and the sequence number SN20 of the RTP packet sent by the GCS AS, and the timestamp reference information is a difference between the timestamp of the BM-SC and the timestamp of the GCS AS; and obtain the synchronization source reference information that is of the GCS AS and that includes the SSRC identifier of the GCS AS, the RTP packet sequence number reference information, and the timestamp reference information.

Optionally, the receiver is configured to receive MBMS bearer request information sent by the GCS AS, where the MBMS bearer request information includes the synchronization source information of the GCS AS, and the processor is configured to obtain the synchronization source information of the GCS AS from the MBMS bearer request information; or the receiver is configured to receive an RTP packet that is sent by the GCS AS and that includes the synchronization source information of the GCS AS, and the processor is configured to obtain the synchronization source information of the GCS AS from the RTP packet that includes the synchronization source information of the GCS AS.

Optionally, the transmitter is configured to:

send a user service description USD parameter to the UE, where the USD parameter includes the synchronization source information of the GCS AS or the synchronization source reference information of the GCS AS.

Optionally, the transmitter is configured to:

send the RTP packet to the UE, where user data or packet header information of the RTP packet includes the synchronization source information of the GCS AS or the synchronization source reference information of the GCS AS, and the packet header information further includes the synchronization source information of the BM-SC.

When the BM-SC sends the USD parameter to the UE, the transmitter is configured to:

send the USD parameter to the GCS AS, so that the GCS AS sends the USD parameter to the UE in a unicast transmission manner; or send the USD parameter to the GCS AS, so that the GCS AS sends the USD parameter to the UE by using a SIP procedure.

3. When the device shown in FIG. 10 is UE, the receiver is configured to receive synchronization source information of a second network side device that is sent by a first network side device or synchronization source reference information of a second network side device that is sent by a first network side device, and a Real-Time Transport Protocol RTP packet that is sent by the first network side device and that includes synchronization source information of the first network side device; and the processor is configured to: obtain the synchronization source information of the first network side device and the synchronization source information of the second network side device, and save both the synchronization source information of the first network side device and the synchronization source information of the second network side device in a trust list of the UE.

The synchronization source reference information of the second network side device is information determined according to the synchronization source information of the first network side device and the synchronization source information of the second network side device. The first network side device is a broadcast/multicast service center BM-SC, and the second network side device is a group communication service application server GCS AS; or the first network side device is a GCS AS, and the second network side device is a BM-SC.

Optionally, the processor is configured to:

obtain the synchronization source information of the first network side device and the synchronization source reference information of the second network side device by using the received RTP packet that includes the synchronization source information of the first network side device; and determine the synchronization source information of the second network side device according to the synchronization source information of the first network side device and the synchronization source reference information of the second network side device.

Specifically, the synchronization source information of the first network side device includes an SSRC identifier of the first network side device, a sequence number SN10 of an RTP packet sent by the first network side device, and a timestamp of the first network side device.

The synchronization source information of the second network side device includes an SSRC identifier of the second network side device, a sequence number SN20 of an RTP packet sent by the second network side device, and a timestamp of the second network side device.

The synchronization source reference information of the second network side device includes the SSRC identifier of the second network side device, RTP packet sequence number reference information, and timestamp reference information, where the RTP packet sequence number reference information is a difference between the sequence number SN10 of the RTP packet sent by the first network side device and the sequence number SN20 of the RTP packet sent by the second network side device, and the timestamp reference information is a difference between the timestamp of the first network side device and the timestamp of the second network side device.

The processor is configured to:

obtain the SSRC identifier of the second network side device from the synchronization source reference information of the second network side device;

determine, according to the RTP packet sequence number reference information in the synchronization source reference information of the second network side device, and the sequence number SN10 of the RTP packet sent by the first network side device, the sequence number SN20 of the RTP packet sent by the second network side device; and determine the timestamp of the second network side device according to the timestamp reference information in the synchronization source reference information of the second network side device, and the timestamp of the first network side device.

Optionally, the receiver is configured to:

receive SIP information sent by the first network side device to the UE by using a Session Initiation Protocol SIP procedure, where the SIP information includes the synchronization source information of the second network side device or the synchronization source reference information of the second network side device, the first network side device is the GCS AS, and the second network side device is the BM-SC; or receive the RTP packet sent by the first network side device, where packet header information of the RTP packet includes the synchronization source information of the second network side device or the synchronization source reference information of the second network side device, the packet header information further includes the synchronization source information of the first network side device, the first network side device is the GCS AS, and the second network side device is the BM-SC; or receive a user service description USD parameter sent by the first network side device, where the USD parameter includes the synchronization source information of the second network side device or the synchronization source reference information of the second network side device, the first network side device is the BM-SC, and the second network side device is the GCS AS; or receive the RTP packet sent by the first network side device, where user data or packet header information of the RIP packet includes the synchronization source information of the second network side device or the synchronization source reference information of the second network side device, the packet header information further includes the synchronization source information of the first network side device, the first network side device is the BM-SC, and the second network side device is the GCS AS.

Regardless of whether the structure shown in FIG. 10 is the GCS AS, the BM-SC, or the UE, in FIG. 10, the bus may include any quantity of interconnected buses and bridges, and the bus connects circuits together that include one or more processors represented by the processor and a memory represented by the memory. The bus may further connect other circuits such as a peripheral device, a voltage stabilizer, and a power management circuit together. These circuits are all well known in the art, and therefore, are not further described in this specification. The bus interface provides an interface between the bus and the receiver and an interface between the bus and the transmitter. The receiver and the transmitter may be a same element, that is, a transceiver, to provide a unit configured to communicate with other apparatuses on a transmission medium.

The processor is responsible for bus management and general processing, and the memory may be configured to save data used when the processor executes an operation.

Variations and specific instances of the RTP packet transmission method and the synchronization source information obtaining method described in the foregoing embodiments are also applicable to the GCS AS, the BM-SC, and the UE in this embodiment. According to the foregoing detailed descriptions of execution processes of the RTP packet transmission method, the synchronization source information obtaining method, the RTP packet transmission apparatus, and the synchronization source information obtaining apparatus, a person skilled in the art can clearly know implementation methods of the GCS AS, the BM-SC, and the UE in this embodiment. Therefore, for brevity of this specification, details are not described herein.

One or more technical solutions provided in the embodiments of the present disclosure have at least the following technical effects or advantages:

In the embodiments of the present disclosure, a GCS AS obtains synchronization source information of a BM-SC, and the GCS AS provides, for user equipment UE, the synchronization source information of the BM-SC or synchronization source reference information of the BM-SC, and an RTP packet that includes synchronization source information of the GCS AS, so that the UE obtains and saves the synchronization source information of the BM-SC and the synchronization source information of the GCS AS in a trust list of the UE. Alternatively, a BM-SC obtains synchronization source information of a GCS AS, and the BM-SC provides, for user equipment UE, the synchronization source information of the GCS AS or synchronization source reference information of the GCS AS, and an RTP packet that includes synchronization source information of the BM-SC, so that the UE obtains and saves the synchronization source information of the BM-SC and the synchronization source information of the GCS AS in a trust list of the UE. Therefore, in the embodiments of the present disclosure, on one hand, the GCS AS (or the BM-SC) may provide the synchronization source information of the GCS AS (or the synchronization source information of the BM-SC) for the UE by sending the RTP packet. On the other hand, the GCS AS (or the BM-SC) further provides the synchronization source information of the BM-SC (or the synchronization source information of the GCS AS) for the UE. Therefore, when being in a unicast (multicast) transmission manner, the UE can not only obtain the synchronization source information of the GCS AS (or the synchronization source information of the BM-SC), but also can obtain the synchronization source information of the BM-SC (or the synchronization source information of the GCS AS). Therefore, regardless of whether the UE is currently in a unicast transmission manner or a multicast transmission manner, the UE can save the two pieces of synchronization source information in the trust list of the UE. In this way, after an RTP packet transmission manner is switched between a unicast manner and a multicast manner, the two pieces of synchronization source information are saved in the trust list of the UE. Therefore, regardless of whether the GCS AS or the BM-SC transmits an RTP packet after the switching, the UE can identify and trust the received RTP packet, so as to continuously receive RTP packets.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but being not limited to a magnetic disk memory, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided to a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions may be saved in a computer readable memory that can instruct the computer or another programmable data processing device to work in a specific manner, so that the instructions saved in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device to generate computer-implemented processing. Therefore, the instructions executed on the computer or another programmable device provide steps for implementing a specific function in one or more processes in the flowcharts and/or in one or more blocks in the block diagrams.

Obviously, a person skilled in the art can make various modifications and variations to the present disclosure without departing from the spirit and scope of the present disclosure. In this way, the present disclosure is intended to cover these modifications and variations provided that they fall within the scope defined by the following claims of the present disclosure and their equivalent technologies.

What is claimed is:

1. A group communication service application server (GCS AS), comprising:
   a receiver, configured to obtain synchronization source information of a broadcast/multicast service center (BM-SC);
   a transmitter, configured to send, to user equipment (UE), the synchronization source information of the BM-SC or synchronization source reference information of the BM-SC, and a Real-Time Transport Protocol (RTP) packet that comprises synchronization source information of the GCS AS, wherein the synchronization source reference information of the BM-SC comprises information determined according to the synchronization source information of the BM-SC and the synchronization source information of the GCS AS, wherein:
the synchronization source information of the BM-SC comprises a synchronization data source (SSRC) identifier of the BM-SC, a sequence number SN10 of an RTP packet sent by the BM-SC, and a timestamp of the BM-SC, and
the synchronization source information of the GCS AS comprises an SSRC identifier of the GCS AS, a sequence number SN20 of an RTP packet sent by the GCS AS, and a timestamp of the GCS AS; and
a processor, configured to:
determine RTP packet sequence number reference information and timestamp reference information according to the synchronization source information of the BM-SC and the synchronization source information of the GCS AS, wherein the RTP packet sequence number reference information is a difference between the sequence number SN10 of the RTP packet sent by the BM-SC and the sequence number SN20 of the RTP packet sent by the GCS AS, and the timestamp reference information is a difference between the timestamp of the BM-SC and the timestamp of the GCS AS, and
obtain the synchronization source reference information of the BM-SC and that comprises the SSRC identifier of the BM-SC, the RTP packet sequence number reference information, and the timestamp reference information.

2. The GCS AS according to claim 1, wherein the transmitter is configured to:
send, to the UE, the synchronization source reference information of the BM-SC and the RTP packet that comprises the synchronization source information of the GCS AS.

3. A broadcast/multicast service center (BM-SC), comprising:
a receiver, configured to obtain synchronization source information of a group communication service application server (GCS AS);
a transmitter, configured to send, to user equipment (UE), the synchronization source information of the GCS AS or synchronization source reference information of the GCS AS, and a Real-Time Transport Protocol (RTP) packet that comprises synchronization source information of the BM-SC, wherein the synchronization source reference information of the GCS AS comprises information determined according to the synchronization source information of the GCS AS and the synchronization source information of the BM-SC, wherein:
the synchronization source information of the BM-SC comprises a synchronization data source (SSRC) identifier of the BM-SC, a sequence number SN10 of an RTP packet sent by the BM-SC, and a timestamp of the BM-SC, and
the synchronization source information of the GCS AS comprises an SSRC identifier of the GCS AS, a sequence number SN20 of an RTP packet sent by the GCS AS, and a timestamp of the GCS AS; and
a processor, configured to:
determine RTP packet sequence number reference information and timestamp reference information according to the synchronization source information of the BM-SC and the synchronization source information of the GCS AS, wherein the RTP packet sequence number reference information is a difference between the sequence number SN10 of the RTP packet sent by the BM-SC and the sequence number SN20 of the RTP packet sent by the GCS AS, and the timestamp reference information is a difference between the timestamp of the BM-SC and the timestamp of the GCS AS, and
obtain the synchronization source reference information that is of the GCS AS and that comprises the SSRC identifier of the GCS AS, the RTP packet sequence number reference information, and the timestamp reference information.

4. The BM-SC according to claim 3, wherein the transmitter is configured to:
send, to the UE, the synchronization source reference information of the GCS AS and the RTP packet that comprises the synchronization source information of the BM-SC for the UE to obtain the synchronization source information of the GCS AS according to the synchronization source information of the BM-SC and the synchronization source reference information of the GCS AS, and save the synchronization source information of the BM-SC and the synchronization source information of the GCS AS in a trust list of the UE.

5. A group communication service application server (GCS AS), comprising:
a receiver, configured to obtain synchronization source information of a broadcast/multicast service center (BM-SC);
a transmitter, configured to send, to user equipment (UE), the synchronization source information of the BM-SC or synchronization source reference information of the BM-SC, and a Real-Time Transport Protocol (RTP) packet that comprises synchronization source information of the GCS AS, wherein the synchronization source reference information of the BM-SC comprises information determined according to the synchronization source information of the BM-SC and the synchronization source information of the GCS AS; and
wherein the receiver is configured to:
receive active multimedia broadcast multicast service (MBMS) status indication information sent by the BM-SC, wherein the active MBMS status indication information comprises the synchronization source information of the BM-SC, and a processor is configured to obtain the synchronization source information of the BM-SC from the active MBMS status indication information; or
receive the synchronization source information of the BM-SC that is sent by the BM-SC; or
receive an RTP Control Protocol (RTCP) packet that is sent by the BM-SC and that comprises the synchronization source information of the BM-SC, and the processor is configured to obtain the synchronization source information of the BM-SC from the RTCP packet.

6. The GCS AS according to claim 5, wherein the transmitter is configured to:
send Session Initiation Protocol (SIP) information to the UE by using an SIP procedure, wherein the SIP information comprises the synchronization source information of the BM-SC or the synchronization source reference information of the BM-SC.

7. The GCS AS according to claim 5, wherein the transmitter is configured to:
send the RTP packet to the UE, wherein packet header information of the RTP packet comprises the synchronization source information of the BM-SC or the synchronization source reference information of the BM-SC, and the packet header information further comprises the synchronization source information of the GCS AS.

8. A broadcast/multicast service center (BM-SC), comprising:
a receiver, configured to obtain synchronization source information of a group communication service application server (GCS AS);
a transmitter, configured to send, to user equipment (UE), the synchronization source information of the GCS AS or synchronization source reference information of the GCS AS, and a Real-Time Transport Protocol (RTP) packet that comprises synchronization source information of the BM-SC, wherein the synchronization source reference information of the GCS AS comprises information determined according to the synchronization source information of the GCS AS and the synchronization source information of the BM-SC; and
wherein:
the receiver is configured to receive multimedia broadcast multicast service (MBMS) bearer request information sent by the GCS AS, wherein the MBMS bearer request information comprises the synchronization source information of the GCS AS, and a processor is configured to obtain the synchronization source information of the GCS AS from the MBMS bearer request information; or
the receiver is configured to receive an RTP packet that is sent by the GCS AS and that comprises the synchronization source information of the GCS AS, and the processor is configured to obtain the synchronization source information of the GCS AS from the RTP packet that comprises the synchronization source information of the GCS AS.

9. The BM-SC according to claim 8, wherein the transmitter is configured to:
send a user service description (USD) parameter to the UE, wherein the USD parameter comprises the synchronization source information of the GCS AS or the synchronization source reference information of the GCS AS.

10. The BM-SC according to claim 9, wherein the transmitter is configured to:
send the USD parameter to the GCS AS for sending the USD parameter to the UE in a unicast transmission manner; or
send the USD parameter to the GCS AS for sending the USD parameter to the UE by using an SIP procedure.

11. The BM-SC according to claim 8, wherein the transmitter is configured to:
send the RTP packet to the UE, wherein user data or packet header information of the RTP packet comprises the synchronization source information of the GCS AS or the synchronization source reference information of the GCS AS, and the packet header information further comprises the synchronization source information of the BM-SC.

12. User equipment (UE), comprising:
a receiver, configured to:
receive synchronization source information of a second network side device sent by a first network side device or synchronization source reference information of a second network side device sent by a first network side device, and
receive a Real-Time Transport Protocol (RTP) packet sent by the first network side device and that comprises synchronization source information of the first network side device;
a processor, configured to:
obtain the synchronization source information of the first network side device and the synchronization source information of the second network side device,
save both the synchronization source information of the first network side device and the synchronization source information of the second network side device in a trust list of the UE;
wherein the synchronization source reference information of the second network side device is information determined according to the synchronization source information of the first network side device and the synchronization source information of the second network side device;
wherein the first network side device is a broadcast/multicast service center (BM-SC) and the second network side device is a group communication service application server (GCS AS), or the first network side device is a GCS AS and the second network side device is a BM-SC;
wherein the processor is further configured to:
obtain the synchronization source information of the first network side device and the synchronization source reference information of the second network side device by using the received RTP packet that comprises the synchronization source information of the first network side device, and
determine the synchronization source information of the second network side device according to the synchronization source information of the first network side device and the synchronization source reference information of the second network side device; and
wherein the receiver is further configured to:
receive Session Initiation Protocol (SIP) information sent by the first network side device to the UE by using an SIP procedure, wherein the SIP information comprises the synchronization source information of the second network side device or the synchronization source reference information of the second network side device, the first network side device is the GCS AS, and the second network side device is the BM-SC.

13. The UE according to claim 12, wherein the receiver is configured to:
receive the RTP packet sent by the first network side device, wherein packet header information of the RTP packet comprises the synchronization source information of the second network side device or the synchronization source reference information of the second network side device, and the packet header information further comprises the synchronization source information of the first network side device, and wherein the first network side device is the GCS AS and the second network side device is the BM-SC.

14. The UE according to claim 12, wherein the receiver is configured to:
receive a user service description (USD) parameter sent by the first network side device, wherein the USD parameter comprises the synchronization source information of the second network side device or the synchronization source reference information of the second network side device, and wherein the first network side device is the BM-SC and the second network side device is the GCS AS.

15. The UE according to claim 12, wherein the receiver is configured to:
receive the RTP packet sent by the first network side device, wherein user data or packet header information of the RTP packet comprises the synchronization source information of the second network side device or the synchronization source reference information of the second network side device, and the packet header information further comprises the synchronization source information of the first network side device, and wherein the first network side device is the BM-SC and the second network side device is the GCS AS.

16. User equipment (UE), comprising:
a receiver, configured to:
receive synchronization source information of a second network side device sent by a first network side device or synchronization source reference information of a second network side device sent by a first network side device, and
receive a Real-Time Transport Protocol (RTP) packet sent by the first network side device and that comprises synchronization source information of the first network side device;
a processor, configured to:
obtain the synchronization source information of the first network side device and the synchronization source information of the second network side device,
save both the synchronization source information of the first network side device and the synchronization source information of the second network side device in a trust list of the UE;
wherein the synchronization source reference information of the second network side device is information determined according to the synchronization source information of the first network side device and the synchronization source information of the second network side device;
wherein the first network side device is a broadcast/multicast service center (BM-SC) and the second network side device is a group communication service application server (GCS AS), or the first network side device is a GCS AS and the second network side device is a BM-SC;
wherein the processor is configured to:
obtain the synchronization source information of the first network side device and the synchronization source reference information of the second network side device by using the received RTP packet that comprises the synchronization source information of the first network side device, and
determine the synchronization source information of the second network side device according to the synchronization source information of the first network side device and the synchronization source reference information of the second network side device;
wherein the synchronization source information of the first network side device comprises a synchronization data source (SSRC) identifier of the first network side device, a sequence number SN10 of an RTP packet sent by the first network side device, and a timestamp of the first network side device;
wherein the synchronization source information of the second network side device comprises an SSRC identifier of the second network side device, a sequence number SN20 of an RTP packet sent by the second network side device, and a timestamp of the second network side device;
wherein the synchronization source reference information of the second network side device comprises the SSRC identifier of the second network side device, RTP packet sequence number reference information, and timestamp reference information, wherein the RTP packet sequence number reference information is a difference between the sequence number SN10 of the RTP packet sent by the first network side device and the sequence number SN20 of the RTP packet sent by the second network side device, and the timestamp reference information is a difference between the timestamp of the first network side device and the timestamp of the second network side device; and
wherein the processor is configured to:
obtain the SSRC identifier of the second network side device from the synchronization source reference information of the second network side device,
determine, according to the RTP packet sequence number reference information in the synchronization source reference information of the second network side device, and the sequence number SN10 of the RTP packet sent by the first network side device, the sequence number SN20 of the RTP packet sent by the second network side device, and
determine the timestamp of the second network side device according to the timestamp reference information in the synchronization source reference information of the second network side device, and the timestamp of the first network side device.

* * * * *